(12) United States Patent
Kitagawa

(10) Patent No.: US 11,913,771 B2
(45) Date of Patent: Feb. 27, 2024

(54) INFORMATION PROCESSING DEVICE, OBJECT MEASURING SYSTEM, OBJECT MEASURING METHOD, AND PROGRAM STORING MEDIUM

(71) Applicant: NEC Corporation, Tokyo (JP)

(72) Inventor: Takeharu Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 709 days.

(21) Appl. No.: 16/982,150

(22) PCT Filed: Mar. 18, 2019

(86) PCT No.: PCT/JP2019/011204
§ 371 (c)(1),
(2) Date: Sep. 18, 2020

(87) PCT Pub. No.: WO2019/188506
PCT Pub. Date: Oct. 3, 2019

(65) Prior Publication Data
US 2021/0072017 A1 Mar. 11, 2021

(30) Foreign Application Priority Data

Mar. 26, 2018 (JP) ................................. 2018-057974
Jul. 4, 2018 (JP) ................................. 2018-127322

(51) Int. Cl.
*G01B 11/02* (2006.01)
*G06T 7/00* (2017.01)
(Continued)

(52) U.S. Cl.
CPC ............ *G01B 11/022* (2013.01); *G01B 11/14* (2013.01); *G06T 7/20* (2013.01); *G06T 7/60* (2013.01); *G06T 7/97* (2017.01)

(58) Field of Classification Search
CPC ........ G01B 11/022; G01B 11/14; G01B 11/24; G01B 21/045; G01B 11/043; G06T 7/20;
(Continued)

(56) References Cited

U.S. PATENT DOCUMENTS 8,908,915 B2 * 12/2014 Chuang .................. G06T 7/246
382/103
2010/0232650 A1 * 9/2010 Kanetani ............ G01B 11/0608
382/106

(Continued)

FOREIGN PATENT DOCUMENTS

JP 2003-250382 A 9/2003
JP 2010-216891 A 9/2010
(Continued)

OTHER PUBLICATIONS

International Search Report for PCT Application No. PCT/JP2019/011204, dated May 28, 2019.
(Continued)

*Primary Examiner* — Oneal R Mistry
*Assistant Examiner* — Vaisali R Koppolu

(57) ABSTRACT

An information processing device is provided with a calculating unit and a determining unit. The calculating unit calculates, as a length calculation value, a length between parts set for measuring the length of the object, from an image of the object in a captured image in which the object to be measured has been imaged. In accordance with a pre-assigned selection rule, the determining unit selects, from among length calculation values calculated respectively from a plurality of captured images having different image capture time points within a set time range, the length calculation value when the object is in a basic attitude for length measurement, and an assumed length calculation
(Continued)

value, and determines the measured value of the length of the object using the selected length calculation values.

11 Claims, 14 Drawing Sheets

(51) Int. Cl.
*G01B 11/14* (2006.01)
*G06T 7/20* (2017.01)
*G06T 7/60* (2017.01)

(58) Field of Classification Search
CPC ... G06T 7/60; G06T 7/97; G06T 2207/10012; G06T 2207/10021; G06T 7/277; G06T 7/62; Y02A 40/81; A01K 61/95
See application file for complete search history.

(56) References Cited

U.S. PATENT DOCUMENTS

| | | | |
|---|---|---|---|
| 2013/0064432 A1* | 3/2013 | Banhazi | A01K 29/00 382/110 |
| 2015/0204556 A1* | 7/2015 | Kusukame | B60H 1/00742 250/338.3 |
| 2017/0330341 A1* | 11/2017 | Butterworth | G01B 11/02 |
| 2020/0027231 A1* | 1/2020 | Kitagawa | G06T 7/001 |

FOREIGN PATENT DOCUMENTS

| | | |
|---|---|---|
| JP | 2013-201714 A | 10/2013 |
| JP | 2015-222260 A | 12/2015 |

OTHER PUBLICATIONS

English translation of Written opinion for PCT Application No. PCT/JP2019/011204, dated May 28, 2019.

* cited by examiner

TIME

Fig. 17

| NAME OF BUSINESS ENTITY |
| BUSINESS ENTITY NUMBER |
| IMAGE CAPTURE DATE AND TIME |
| SUM OF NUMBER OF MEASUREMENTS (N) |
| FORK LENGTH AVERAGE VALUE (A) |
| FORK LENGTH MAXIMUM VALUE (Max) |
| FORK LENGTH MINIMUM VALUE (Min) |
| FORK LENGTH STANDARD DEVIATION ($\sigma$) |
| BODY WEIGHT AVERAGE VALUE (A) |
| BODY WEIGHT MAXIMUM VALUE (Max) |
| BODY WEIGHT MINIMUM VALUE (Min) |
| BODY WEIGHT STANDARD DEVIATION ($\sigma$) |
| MEASURED VALUE (FISH DATA NUMBER: 1) |
| ⋮ |
| MEASURED VALUE (FISH DATA NUMBER: n-1) |
| MEASURED VALUE (FISH DATA NUMBER: n) |

INFORMATION PROCESSING DEVICE, OBJECT MEASURING SYSTEM, OBJECT MEASURING METHOD, AND PROGRAM STORING MEDIUM

This application is a National Stage Entry of PCT/JP2019/011204 filed on Mar. 18, 2019, which claims priority from Japanese Patent Application 2018-057974 filed on Mar. 26, 2018 and Japanese Patent Application 2018-127322 filed on Jul. 4, 2018, the contents of all of which are incorporated herein by reference, in their entirety.

TECHNICAL FIELD

The present invention relates to a technique for measuring the length of an object to be measured, from a captured image in which the object to be measured has been imaged.

BACKGROUND ART

In order to improve fish culture technique, the growth of cultured fish is observed. PTL 1 discloses a technique concerning the observation of fish. In this technique of PTL 1, the shape and size of the head, body, tail fin, and other parts of a fish are estimated for each part based on the captured images of the dorsal side (or the ventral side) of the fish imaged from the upper side (or the bottom side) and the side of the water tank and the captured image of the front face on the head side. The shape and size of each part of the fish are estimated using a plurality of template images assigned for each part. That is, the captured image of each part is collated with the template image of each part one by one, and the size of each part of the fish is estimated based on known information such as the size of the part of the fish in the template image that matches the captured image.

CITATION LIST

Patent Literature

[PTL 1] JP 2003-250382 A

SUMMARY OF INVENTION

Technical Problem

In the technique described in PTL 1, the size of the part of the fish is estimated based on known information on the size of the part of the fish in the template image. In other words, the technique disclosed in PTL 1 merely detects the size of the part of the fish in the template image as the size of the part of the fish to be measured, and it cannot be said that the size of the fish to be measured is measured.

When the body length of the fish to be measured is measured from a plurality of captured images in which the fish to be measured has been imaged, a situation occurs in which the measured values of the body length of the fish differ from each other, in other words, the measured values vary even for one and the same fish.

The present invention has been made to solve the above problems. That is, it is a main object of the present invention to provide a technique capable of enhancing the reliability of a measured value when the length of an object to be measured is measured from a captured image in which the object to be measured has been imaged.

Solution to Problem

In order to attain the above object, an information processing device according to the present invention includes:

a calculating unit that calculates, as a length calculation value, a length between parts set for measuring a length of an object to be measured, from an image of the object in a captured image in which the object has been imaged; and a determining unit that selects, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determines a measured value of the length of the object using the selected length calculation value.

An object measuring system according to the present invention includes:

an image capturing device that images an object to be measured; and an information processing device that calculates a measured value of a length between parts set for measuring a length of the object, from an image of the object in a captured image captured by the image capturing device, in which the information processing device includes:

a calculating unit that calculates, as a length calculation value, the length between the parts set for measuring the length of the object, from an image of the object in the captured image; and a determining unit that selects, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determines the measured value of the length of the object using the selected length calculation value.

An object measuring method according to the present invention includes:

calculating, as a length calculation value, a length between parts set for measuring a length of an object to be measured, from an image of the object in a captured image in which the object has been imaged; and selecting, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determining a measured value of the length of the object using the selected length calculation value.

A program storing medium according to the present invention stores a computer program that causes a computer to execute a process including:

calculating, as a length calculation value, a length between parts set for measuring a length of an object to be measured, from an image of the object in a captured image in which the object has been imaged; and selecting, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determining a measured value of the length of the object using the selected length calculation value.

Advantageous Effects of Invention

According to the present invention, the reliability of a measured value can be enhanced when the length of an object to be measured is measured from a captured image in which the object to be measured has been imaged.

BRIEF DESCRIPTION OF DRAWINGS

FIG. 17 is a diagram explaining an example of information transmitted from an information processing device to an information providing device according to the fifth example embodiment.

EXAMPLE EMBODIMENT

Example embodiments according to the present invention will be described below with reference to the drawings.

First Example Embodiment

Figure 1:
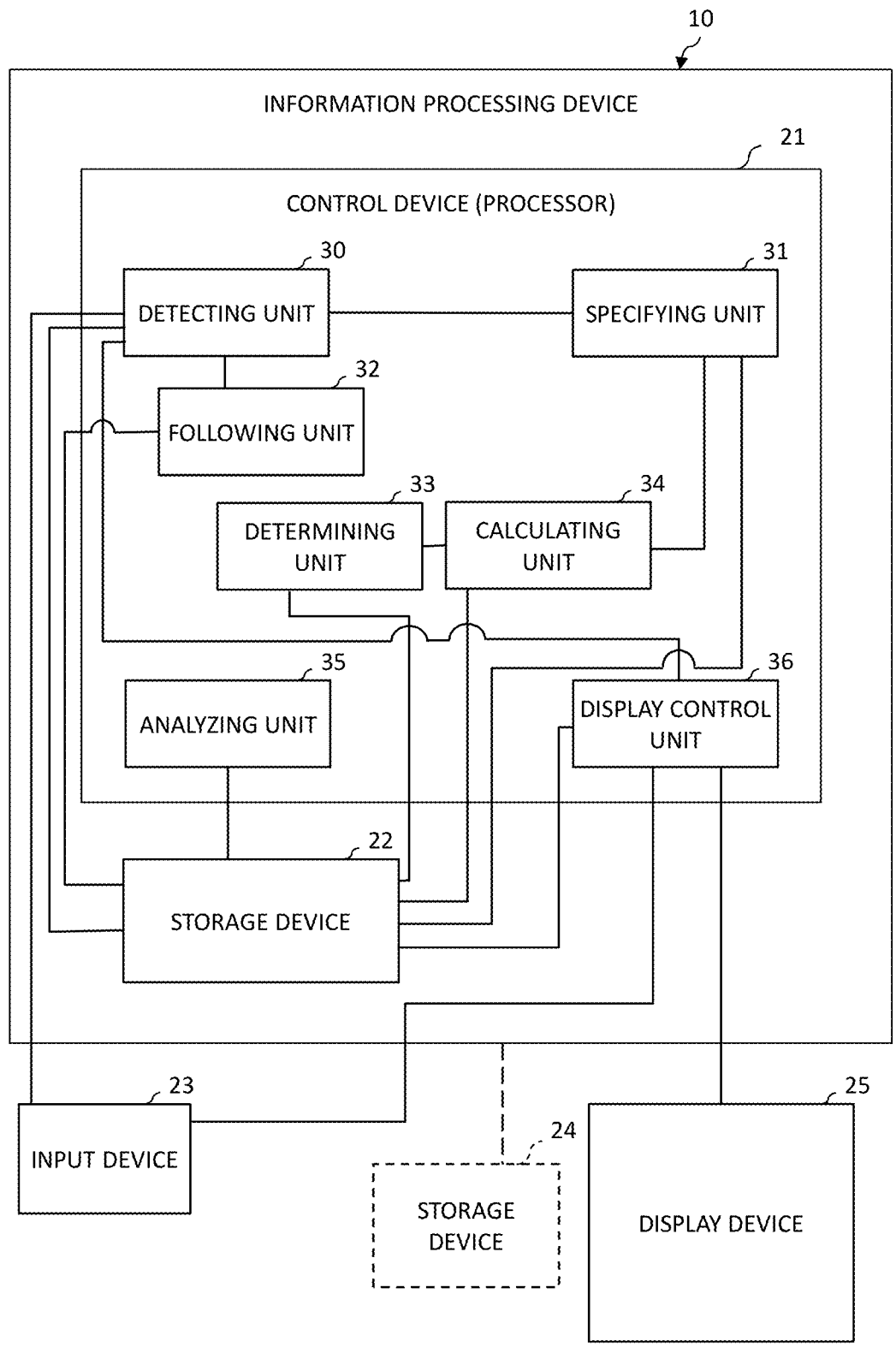
FIG. 1 is a block diagram illustrating an example of a simplified configuration of an information processing device according to a first example embodiment of the present invention.
Figure 2:
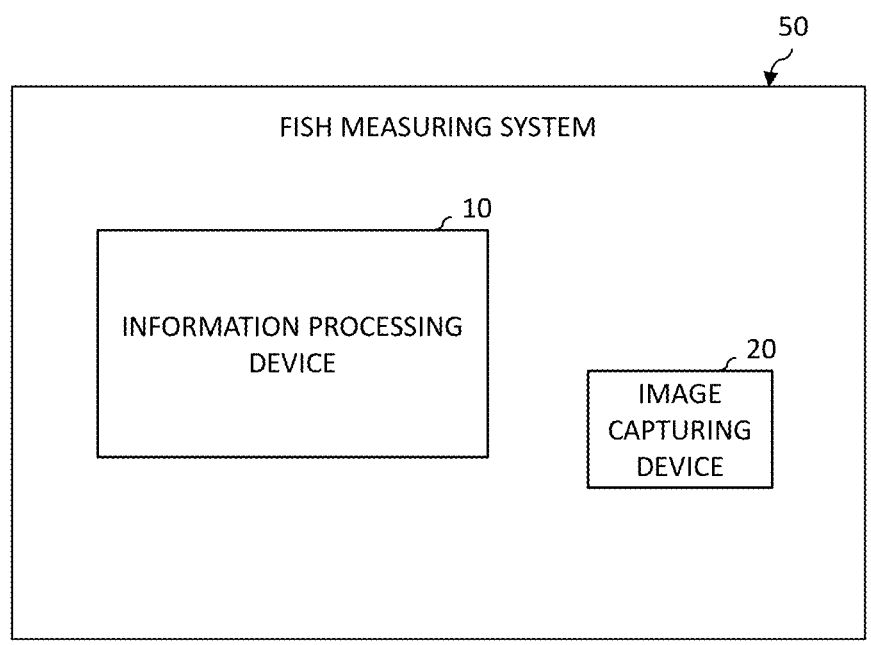
FIG. 2 is a block diagram illustrating a simplified configuration of a fish measuring system including the information processing device of the first example embodiment.

FIG. 1 is a block diagram illustrating a simplified configuration of an information processing device according to a first example embodiment of the present invention. As illustrated in FIG. 2, the information processing device 10 of the first example embodiment, together with an image capturing device 20, constitutes a fish measuring system 50, which is an object measuring system. The fish measuring system 50 has a function of calculating a measured value of a length (fork length) of a fish, which is an object to be measured, by the information processing device 10 from an image of the fish captured by the image capturing device 20.

In the first example embodiment, the image capturing device 20 has a configuration capable of acquiring not only length information in a vertical direction and a horizontal direction of the captured image, but also length information in a depth direction of the captured image. In other words, the image capturing device 20 has a configuration capable of generating a stereoscopic photograph through reproducing the binocular parallax by imaging a target object simultaneously from a plurality of different directions. As an image capturing device having such a configuration, there is a camera called a stereo camera (a camera mounted with a plurality of lenses in a side-by-side arrangement state on a single camera, and capable of acquiring a plurality of captured images simultaneously captured through these lenses); in the first example embodiment, however, the image capturing device 20 having the configuration as follows is adopted.

That is, the image capturing device 20 has a configuration in which two cameras are fixed to a support member in a state in which the cameras are arranged side by side with an interval (for example, one meter) interposed between the cameras. Lenses provided on these cameras are pointing in the same direction. The cameras also have a function of capturing a video. The cameras may not have a video capturing function, but may have a function of intermittently capturing still images at every set time interval, for example.

In the first example embodiment, the image capturing device 20 enters, for example, an aquaculture farm in which fish are cultured, and is disposed at a water depth and with orientation of the lenses determined to be suitable for observing fish (in different terms, imaging a fish that is an object to be measured). A description of an approach of disposing the image capturing device 20 at an appropriate water depth and with appropriate orientation of the lenses in the aquaculture farm will be omitted. Calibration of the image capturing device 20 (cameras) is performed by an appropriate calibration approach in consideration of the environment of the aquaculture farm, the kind of the fish to be measured, and the like. A description of such a calibration approach will be omitted here.

The captured images captured by the cameras of the image capturing device 20 may be taken in the information processing device 10 from each camera by wire communication or wireless communication, or may be taken in the information processing device 10 from a portable storage medium (for example, a secure digital (SD) card) after being saved in the portable storage medium.

As illustrated in FIG. 1, schematically, the information processing device 10 includes a control device 21 and a storage device 22. The information processing device 10 is connected to an input device (for example, a keyboard, a mouse, or a touch panel) 23 that inputs information to the information processing device 10, for example, by an operation of a measurer, and a display device 25 that displays information. The information processing device 10 may be connected to an external storage device 24 provided separately from the information processing device 10.

The storage device 22 has a function of storing various types of data and a computer program (hereinafter also referred to as program), and is implemented by a storage medium such as a hard disk device or a semiconductor memory, for example. The storage device provided in the information processing device 10 is not limited to one storage device, and a plurality of types of storage devices may be included in the information processing device 10, in which case, the plurality of storage devices will be collectively referred to as the storage device 22. Similarly to the storage device 22, the storage device 24 also has a function of storing various types of data and a computer program, and is implemented by a storage medium such as a hard disk device or a semiconductor memory, for example. When the information processing device 10 is connected to the storage device 24, appropriate information is saved in the storage device 24. In this case, the information processing device 10 executes processes of writing and reading information to and from the storage device 24 as appropriate, but a description regarding the storage device 24 will be omitted in the following description.

In the first example embodiment, the captured image by the image capturing device 20 is saved in the storage device 22 in a state associated with information relating to the image capture status, such as identification information that identifies, for example, a camera that has captured the captured image, and information on the image capture time.

The control device 21 is constituted by, for example, a processor such as a central processing unit (CPU) or a graphics processing unit (GPU). The control device 21 can have functions as follows, for example, by the processor executing a computer program saved in the storage device 22. That is, the control device 21 includes, as functional units, a detecting unit 30, a specifying unit 31, a following unit 32, a determining unit 33, a calculating unit 34, an analyzing unit 35, and a display control unit 36.

The display control unit 36 has a function of controlling the display action of the display device 25.

The detecting unit 30 has a function of detecting a fish to be measured from a captured image displayed (played back) on the display device 25, and a function of detecting a measurement use point of the detected fish to be measured. For example, the detecting unit 30 detects a fish body to be measured, using reference data for fish body detection saved in the storage device 22 for every set number of frames of the captured image displayed (played back) on the display device 25. The reference data for fish body detection is generated by machine learning, for example. In the machine learning, a large number of images of fish bodies of a kind of fish to be measured are used as teacher data to learn the fish bodies of the kind to be measured. There are a variety of approaches for machine learning, and an appropriate machine learning approach is adopted here.

Figure 3:
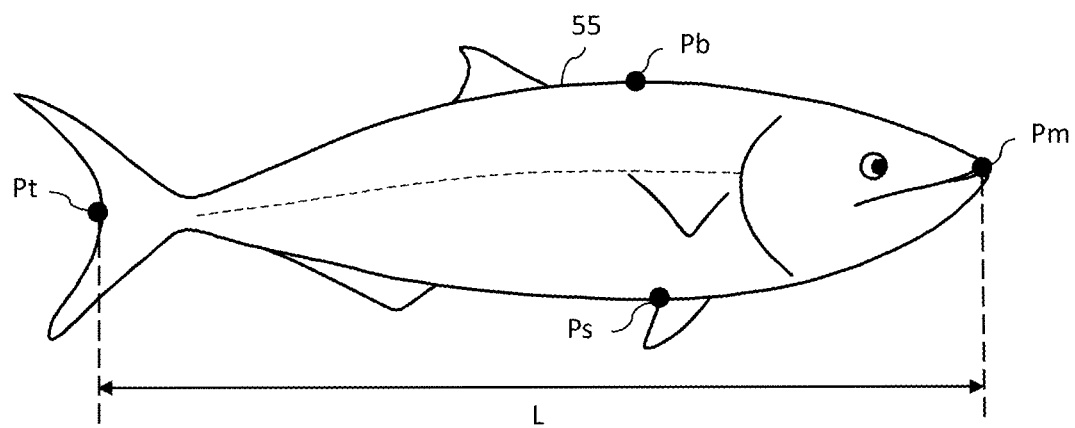
FIG. 3 is a diagram explaining a length measuring portion of an object (fish) to be measured.

The detecting unit 30 also has a function of detecting a measurement use point having predetermined characteristics of a fish detected to be measured, in the captured image. Here, a portion Pt where a tail forks in two and a tip of the mouth Pm of a fish 55 as illustrated in FIG. 3, which are used to measure a fork length of the fish, are detected as measurement use points. If necessary, the detecting unit 30 may be configured to further detect, as measurement use points, a top portion Pb on the dorsal side and a root portion Ps of a ventral fin as the most bulging portion on the ventral side as illustrated in FIG. 3, which are used for measuring the body depth of the fish 55.

There are a variety of approaches as detection approaches for the measurement use points Pt and Pm (Pb and Ps) as described above, and the detecting unit 30 detects the measurement use points by an appropriate approach selected in consideration of the needs of the measurer, the performance of the control device, and the like. Some approaches will be exemplified as follows.

For example, the detecting unit 30 prompts the measurer to designate a measurement use point (dotting) using the input device 23 in the image of the fish to be measured, by a message display or the like. Then, the detecting unit 30 detects the measurement use point in the image of the fish to be measured, based on input information by the operation of the measurer who has responded to the message display. The measurement use point input by the measurer is clearly indicated on the display device 25 by the display control unit 36, and thus the information processing device 10 is provided with a configuration in which the position of the measurement use point input by the measurer can be confirmed. The information processing device 10 is also configured to accept the input of the measurement use point again after the measurer has input the measurement use point.

As another example of the measurement use point detection approach, for example, the detecting unit 30 may detect the measurement use points Pt and Pm (Pb and Ps) based on reference data for measurement use point detection generated by machine learning. The reference data for measurement use point detection is generated by machine learning using the image data of the whole fish body to which the measurement use points Pt and Pm (Pb and Ps) are attached, as teacher data, and is saved in the storage device 22.

Alternatively, the reference data for measurement use point detection may be reference data for each fish body part instead of the whole fish body. The reference data for each fish body part is generated by machine learning using the image data of each fish body part (such as the tip portion of the mouth or the tail portion) to which the measurement use points Pt and Pm (Pb and Ps) are properly attached, as teacher data. Here, an image extracted in such a way that the center of the image data of the fish body part coincides with any of the measurement use points Pt and Pm (Pb and Ps) is used as teacher data. The reference data for measurement use point detection for each fish body part by machine learning using such teacher data is meaningful in that the center position of the reference data represents one of the measurement use points Pt and Pm (Pb and Ps).

The detecting unit 30 further has a function of causing the display device 25 to clearly indicate the positions of the detected measurement use points Pt and Pm (Pb and Ps) using, for example, marks or points, using the display control unit 36.

The specifying unit 31 has a function of specifying coordinates representing the positions in a coordinate space of the measurement use points Pt and Pm (Pb and Ps) of the fish to be measured, which have been detected by the detecting unit 30. For example, the specifying unit 31 receives, from the detecting unit 30, display position information representing the display positions where the measurement use points Pt and Pm (Pb and Ps) of the fish to be measured, which have been detected by the detecting unit 30, are displayed in the captured image of each camera of the image capturing device 20. The specifying unit 31 reads, from the storage device 22, interval information representing the interval between the cameras of the image capturing device 20 (in different terms, the interval between the image capture positions), which is stored in the storage device 22. Then, the specifying unit 31 uses these pieces of information to specify (calculate) the coordinates in the coordinate space of the measurement use points Pt and Pm (Pb and Ps) of the fish to be measured, by the triangulation.

The calculating unit 34 has a function of calculating, as a length calculation value of the fish to be measured, an interval L between the measurement use points Pm and Pt as illustrated in FIG. 3, using the spatial coordinates of the measurement use points Pm and Pt at the tip of the mouth and the tail of the fish to be measured, which have been specified by the specifying unit 31. The thus calculated length calculation value of the fish measured as a target is saved in the storage device 22 in a state associated with predetermined information such as the observation date and time.

The calculating unit 34 may further have a function of calculating the body depth of the fish to be measured, when the coordinates of the measurement use points Pb and Ps as illustrated in FIG. 3 are specified (calculated) by the functions of the detecting unit 30 and the specifying unit 31. As an approach of calculating the body depth, for example, there is an approach of calculating the length between the measurement use points Pb and Ps as the body depth. The approach of calculating the body depth is not limited to this approach, and an appropriate approach in consideration of the kind of fish (the shape of the fish body) is adopted. The calculated body depth of the fish to be measured is saved in the storage device 22 in a state associated with predetermined information such as the length calculation value of the fork length of the same fish and the observation date and time, for example.

The following unit 32 has a function of tracking (following) fish detected as fish to be measured, by the detecting unit 30 in a plurality of captured images having different image capture time points within a preset time range. In the first example embodiment, for example, when the detecting unit 30 detects a plurality of fish to be measured in the same captured image within the set time range as described above, the following unit 32 tracks the fish to be measured in the plurality of captured images within the set time range. There are a variety of approaches of tracking (following), and the approach of tracking (following) used by the following unit 32 is not limited, which includes, for example, approaches using a Kalman filter or a particle filter, and an approach using a pre-assigned tracking rule. In the approach using the tracking rule, for example, a rule assigned as one of the tracking rules is that the displacement distance of a detection point (extracted point) such as the measurement use point Pm is equal to or less than a set value and detection points are not too apart from each other between continuous frames of the image used for measurement. The set value is, for example, set based on a swimming speed assumed in consideration of the kind of fish to be measured, and the like. As a tracking rule, a rule that a forward direction (migration direction) of the fish is right is also assigned. The forward direction of the fish is detected using, for example, the image of the head portion of the fish and data for forward direction detection acquired by machine learning. In the machine learning, the image of the head portion of the fish to which information on the forward direction of the fish is given is used as teacher data, and the data for forward direction detection is generated based on such teacher data. In the approach using the tracking rule, a fish having a high probability of being the same fish is detected (selected) from a plurality of captured images having different image capture time points, using the tracking rules as described above, and thus the fish is tracked.

The following unit 32 further has a function of associating a plurality of length calculation values calculated from the images of the tracked fish having a high probability of being the same fish, into a group, and storing information on the grouping in the storage device 22 in association with fish body identification information that identifies the fish body.

In the first example embodiment, it is assumed that the set time range is a short time, for example, about one to three seconds. For this reason, when one fish to be measured is detected in each of a plurality of captured images within the set time range, it is assumed that the fish to be measured, which have been thus detected, are all the same fish. Because of this assumption, in the first example embodiment, when one fish to be measured is detected in the captured images within the set time range, the following (tracking) process is omitted.

Figure 4:
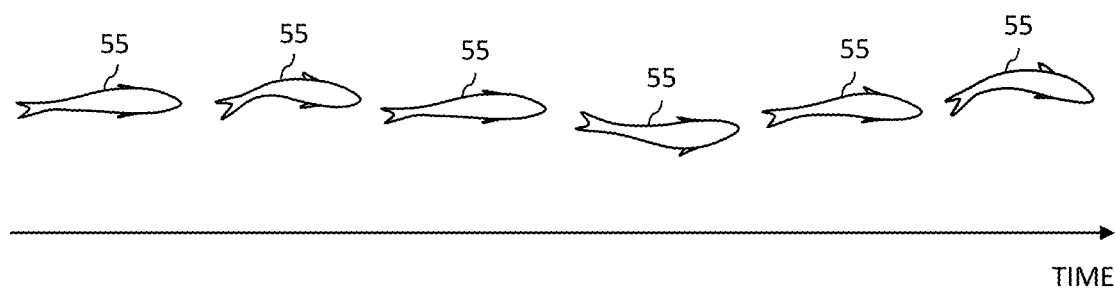
FIG. 4 is a diagram illustrating an example of changes in attitude of an object (fish) to be measured.
Figure 5:
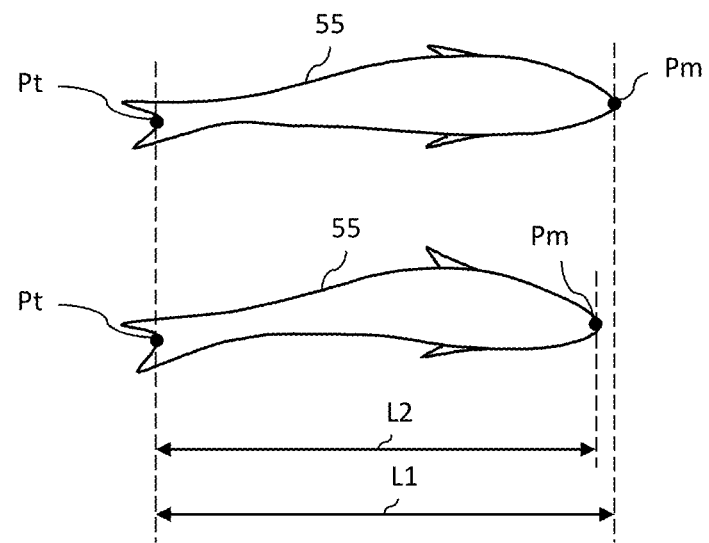
FIG. 5 is a diagram explaining variations in length calculation values caused by wriggling of an object (fish) to be measured.

FIG. 4 is a diagram illustrating temporal changes in attitude of the fish in a state viewed from the upper side of the dorsal part of the fish. The fish illustrated in FIG. 4 swims with its fish body wriggling, and the attitude changes from moment to moment. Therefore, as illustrated in FIG. 5, length calculation values L1 and L2 calculated by the calculating unit 34 differ from each other due to wriggling of the fish body even for the same fish 55. In other words, the length calculation value L2 calculated by the calculating unit 34 from the captured image of the fish body in the case of an attitude with larger wriggling is smaller than the length calculation value L1 calculated in the case of an attitude with no wriggling or smaller wriggling, even for the same fish 55.

The information processing device 10 according to the first example embodiment is configured to enhance the reliability of the length calculation value by suppressing variations in length calculation values caused by wriggling of the fish body as described above. That is, the information processing device 10 includes the determining unit 33, and the determining unit 33 has a function in consideration of the matters as follows in order to suppress an adverse effect on the length calculation value due to wriggling of the fish body.

Figure 6:
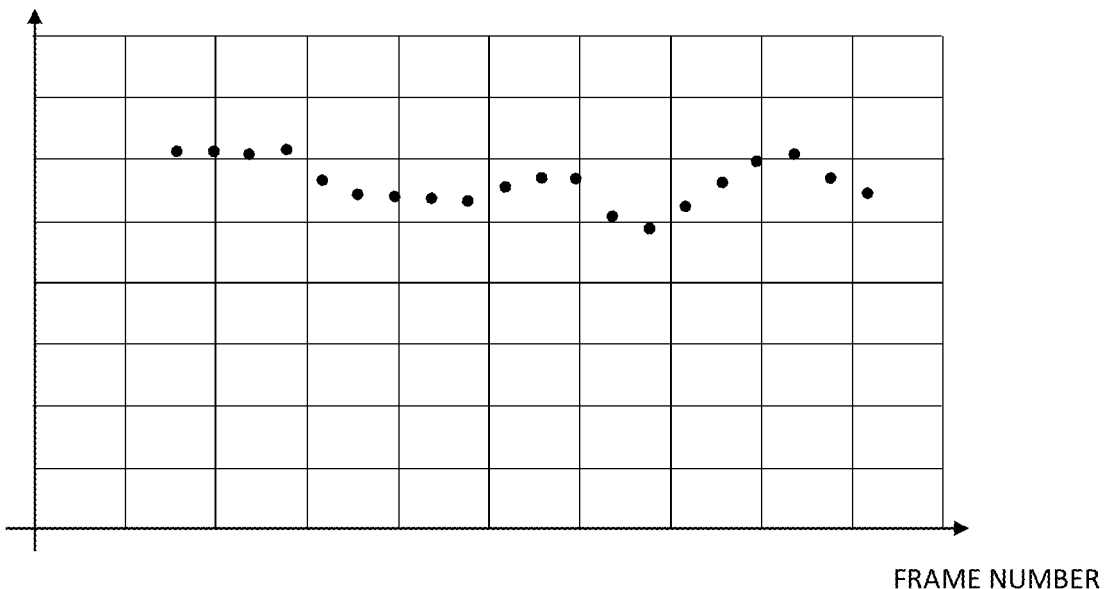
FIG. 6 is a graph illustrating a state of variations in length calculation values of an object (fish) to be measured.
Figure 7:
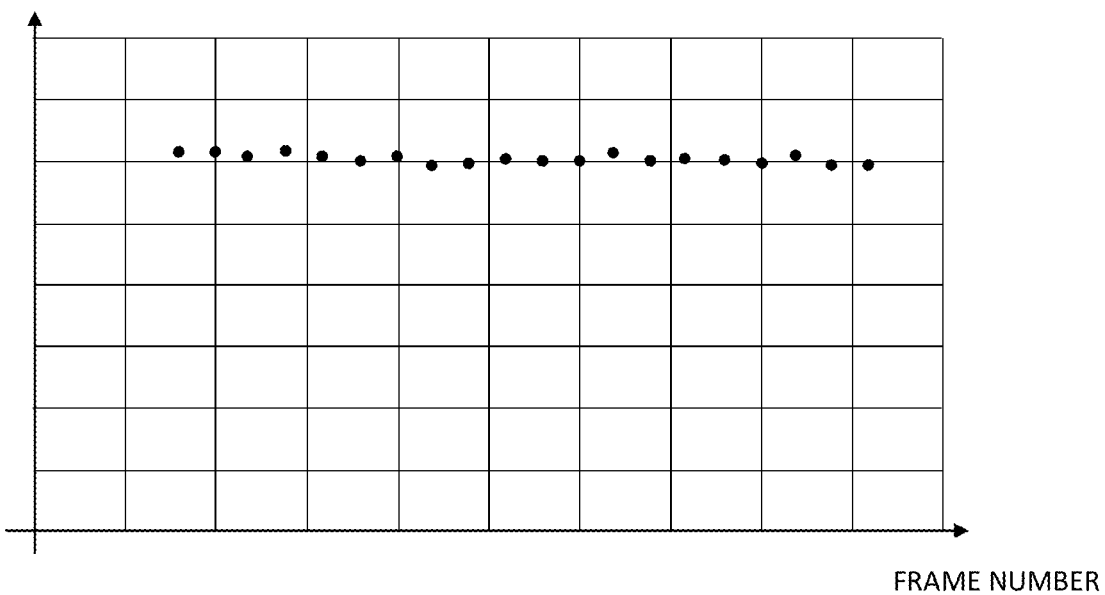
FIG. 7 is a graph illustrating another state of variations in length calculation values of an object (fish) to be measured.

FIGS. 6 and 7 are graphs each illustrating, by dots, an example of the relationship between the length calculation value calculated by the calculating unit 34 and the frame number (in different terms, the image capture time) of the captured image from which the length calculation value is calculated, for the same fish. In the graphs in FIGS. 6 and 7, the magnitude of the numerical value of one scale on each of the vertical axis and the horizontal axis is the same between FIGS. 6 and 7. The interval of the image capture times between the leftmost length calculation value and the rightmost length calculation value illustrated in each of the graphs in FIGS. 6 and 7 is about one second.

FIGS. 6 and 7 indicate different variation widths of length calculation values from each other. This gap is produced due to the difference in the wriggling state of the fish bodies. In other words, the graph in FIG. 6 illustrates an example of the length calculation value calculated in a case where, for example, the fish swims while wriggling the whole fish body in such a way as to bend in the shape of a "hook" with a center portion of the fish body as the center, when the fish body is viewed from the upper side of the dorsal part. The graph in FIG. 7 illustrates an example of the length calculation value calculated in a case where the tail fin is moved with a root portion of the tail fin as the center of bending but the main portion of the fish body is not wriggled (tail fin wriggling state). As compared with the variations in the length calculation values in a case where the whole fish body is wriggled as illustrated in FIG. 6, the variations in the length calculation values in the tail fin wriggling state illustrated in FIG. 7 is small. In other words, in the tail fin wriggling state, although depending on the kind of fish, the length of the wriggling portion (tail fin) is approximately one eighth of the body length (a length from the tip of the mouth to the tip end of the tail), and the length of the wriggling portion is shorter than that in a state in which the whole fish body is wriggled. Such a difference in the length of the wriggling portion is a factor of the difference in the variation width of the length calculation values.

As described above, the wriggling includes a plurality of patterns having different wriggling portions, and the variation width of the length calculation values has differences depending on the wriggling pattern. However, when a state in which the spine of the fish overlaps the straight line connecting the tip of the mouth and the tail is defined as a basic attitude of the fish to be measured, the length calculation value in the basic attitude takes the largest (longest) value among the length calculation values regardless of the wriggling pattern. In the first example embodiment, a length calculation value calculated from an image of the fish to be measured, which has been captured when such a basic attitude is taken, is determined as a measured value of the fork length of the fish to be measured.

In consideration of the above matters, the determining unit 33 has a function of selecting, in accordance with a pre-assigned selection rule, a length calculation value when the basic attitude is assumed to be taken, from among the length calculation values individually calculated from a plurality of captured images having different image capture time points within a set time range. The selection rule is, for example, a rule that a length calculation value having the largest numerical value and a plurality of length calculation values whose calculation order is continuous with the above length calculation value as the center (for example, five length calculation values each before and after the length calculation value with the maximum value) are selected from among the length calculation values calculated from a plurality of captured images within the set time range. Alternatively, the selection rule may be a rule that a set number of length calculation values (for example, ten length calculation values) are selected in descending order of numerical value from among the length calculation values calculated from a plurality of captured images within the set time range. Still alternatively, the selection rule may be a rule that a length calculation value having the largest numerical value is selected from among the length calculation values calculated from a plurality of captured images within the set time range.

The determining unit 33 has a function of determining the measured value of the fork length of the fish to be measured, using the selected length calculation value. For example, when a plurality of length calculation values is selected in accordance with a selection rule, the determining unit 33 calculates an average value of the selected plurality of length calculation values, and determines the calculated average value as a measured value of a fork length L of the fish to be measured. Alternatively, when a length calculation value with the maximum value is selected in accordance with a selection rule, the determining unit 33 determines the selected length calculation value with the maximum value as a measured value of the fork length L of the fish to be measured.

When a plurality of fish to be measured is detected in captured images within the set time range to be processed by the determining unit 33, and the length calculation values are grouped by the following unit 32 for each fish to be measured, the determining unit 33 determines the measured value of the fork length L of the fish for each group. The determining unit 33 may execute the process at a preset timing (for example, every set time interval) or at a time designated by the measurer using the input device 23. The set time range to be processed by the determining unit 33 may be a time range calculated based on the execution timing or a time range designated by the measurer using the input device 23.

The determining unit 33 further has a function of saving information on the measured value of the fork length L of the fish determined as described above, in the storage device 22. When the measured value of the fork length L of the fish is written into the storage device 22, for example, appropriate information is associated with the measured value of the fork length L of the fish, such as information on the length calculation value used for the process of determining the measured value of the fork length L, and information representing the position in the captured image of the fish to be measured relevant to the written fork length L.

The analyzing unit 35 has a function of executing predetermined analysis using the measured values of the fork lengths L of a plurality of fish saved in the storage device 22 and information associated with the information on these measured values. For example, the analyzing unit 35 calculates the average value of the measured values of the fork lengths L of the plurality of fish in an aquaculture farm on the observation date. In a case where the average value of the measured values of the fork lengths L of a plurality of fish in an aquaculture farm is calculated and individual fish is not identified, there is a concern that the value of a single fish may be used multiple times as the measured values of the fork lengths L of the fish used for calculating the average value. However, when the average value of a large number of measured values is calculated, an adverse effect on the calculation accuracy of the average value due to the multiple times of the use of a value is reduced.

The analyzing unit 35 may also calculate a relationship between the fork lengths L of the fish in the aquaculture farm and the number of the fish (fish number distribution with respect to the fork length L of the fish). The analyzing unit 35 may further calculate the temporal transition of the fork length L of a fish representing the growth of the fish.

When the measured value of the body depth of the fish to be measured has been calculated by the functions of the detecting unit 30, the specifying unit 31, and the calculating unit 34, the analyzing unit 35 may further have a function of calculating the body weight of the fish to be measured, using the calculated measured values of the fork length L and the body depth. In this case, data for body weight calculation is saved in advance in the storage device 22. The data for body weight calculation is data for calculating the body weight of a fish based on the fork length L and the body depth, and is given, for example, in the form of a mathematical formula. This data for body weight calculation is data generated based on a relationship between the fork length and the body depth, and the body weight, where this relationship is acquired based on the fork length, the body depth, and the body weight of a fish actually measured. When the relationship between the fork length, the body depth, and the body weight differs depending on the age in months or the age in years of the fish, the data for body weight calculation is generated for each age in months or age in years of the fish and saved in the storage device 22.

The analyzing unit 35 calculates the body weight of the fish to be measured, based on the calculated measured values of the fork length L and body depth of the fish to be measured and the data for body weight calculation (data for body weight calculation according to the age in months or age in years of the fish to be measured, when there is data for body weight calculation by age in months or age in years). The body weight of the fish to be measured, which has been calculated by the analyzing unit 35, and the measured values of the fork length L and body depth of the fish to be measured are associated with each other, and in addition, are saved in the storage device 22 in a state associated also with predetermined information (for example, the image capture date and time). The display control unit 36 may have a function of reading information to be displayed, from the storage device 22 and displaying the read information on the display device 25 in response to an instruction by the measurer to display the above calculated values on the display device 25 using the input device 23, when receiving the input of the instruction, for example.

Figure 8:
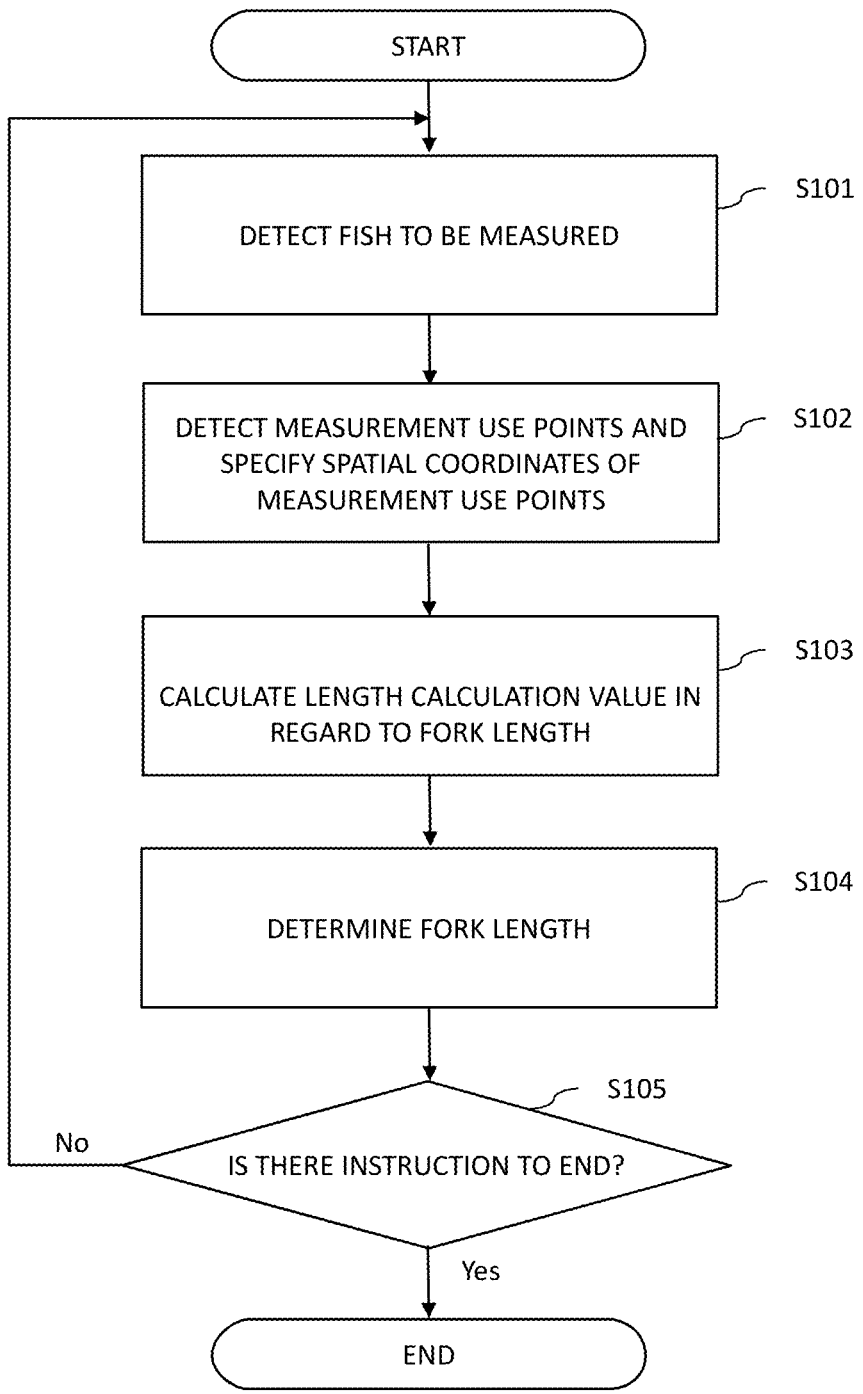
FIG. 8 is a flowchart explaining an example of a control action relating to length measurement of an object (fish) to be measured in the information processing device of the first example embodiment.

An example of an action in which the information processing device 10 calculates a measured value of the fork length L of fish from a captured image will be described below with reference to FIG. 8. FIG. 8 is a flowchart illustrating a processing procedure related to the calculation (measurement) of the fork length L of fish to be executed by the information processing device 10.

For example, when accepting an instruction to start measurement, the detecting unit 30 of the information processing device 10 detects a fish to be measured from a captured image (step S101). This detection of the fish to be measured is executed based on, for example, the reference data for fish body detection by machine learning.

After detecting the fish to be measured, the detecting unit 30 detects the measurement use points Pt and Pm (Pb and Ps) in the fish to be measured. This action of detecting the measurement use points Pt and Pm (Pb and Ps) is a detection action based on the reference data for measurement use point detection by machine learning. Alternatively, the action of detecting the measurement use points Pt and Pm (Pb and Ps) is a detection action based on manual input information by the measurer. Alternatively, the detecting unit 30 may detect the measurement use points Pt and Pm (Pb and Ps) by one of the detection actions based on selection information input by the measurer through the input device 23, between the detection action based on the reference data for measurement use point detection by machine learning and the detection action based on the manual input information by the measurer.

Thereafter, the specifying unit 31 specifies the coordinates of the detected measurement use points Pt and Pm (Pb, Ps) in a coordinate space by the triangulation using, for example, interval information between the cameras (between the image capture positions) of the image capturing device 20 (step S102).

Then, based on the specified coordinates, the calculating unit 34 calculates the interval L between the measurement use points Pt and Pm (the tip of the mouth and the tail) as a length calculation value in regard to the fork length of the fish to be measured (step S103). The calculating unit 34 also calculates the body depth of the fish to be measured, if necessary, using the measurement use points Pb and Ps.

Subsequent to this, the determining unit 33 determines the measured value of the fork length L in which an adverse effect on the fork length caused by wriggling of the fish body is suppressed, using the length calculation values in regard to the fork length of the fish to be measured, which have been individually calculated from a plurality of captured images within the set time range (step S104).

Thereafter, the control device 21 of the information processing device 10 determines whether an instruction to end the fish measurement action is input by, for example, an operation on the input device 23 by the measurer (step S105). Then, when no instruction to end is input, the control device 21 repeats the actions from step S101. When an instruction to end is input, the control device 21 ends the fish measurement action.

The information processing device 10 and the fish measuring system 50 according to the first example embodiment have a configuration in which variations in the length calculation values caused by wriggling of the fish body are taken into consideration for the measurement of the fork length of a fish. That is, the determining unit 33 of the information processing device 10 has a function of selecting a length calculation value when the basic attitude of fish for length measurement is assumed to be taken, from among the length calculation values of the fork lengths of the fish to be measured individually calculated from a plurality of captured images within the set time range. The determining unit 33 further has a function of determining the measured value of the fork length L of the fish using the selected length calculation value. The measured value of the fork length L of the fish to be measured, which is calculated by such functions of the determining unit 33, suppresses an adverse effect on the fork length caused by wriggling, and accordingly the certainty of the fork length L can be enhanced. Consequently, the information processing device 10 and the fish measuring system 50 can enhance the reliability of the calculation of the fork length L.

In the information processing device 10 of the first example embodiment, the detecting unit 30 may have a function of detecting a fish body to be measured and the measurement use points Pt and Pm (Pb and Ps) based on reference data for measurement use points by machine learning. In this case, since the measurer does not have to work on designating the measurement use points Pt and Pm (Pb and Ps), the information processing device 10 and the fish measuring system 50 can decrease the measurer's labor. The information processing device 10 and the fish measuring system 50 also can speed up the process of measuring the fork length L of a fish.

Second Example Embodiment

A second example embodiment according to the present invention will be described hereinafter. In the description of the second example embodiment, constituent elements having the same names as those of the elements constituting the information processing device and the object measuring system (fish measuring system) of the first example embodiment are denoted by the same reference signs, and redundant description of these common elements will be omitted.

An information processing device 10 and a fish measuring system 50 of the second example embodiment have, in addition to the configuration of the first example embodiment, a function of correcting the length calculation value in regard to the fork length calculated by a calculating unit 34. That is, an image capturing device 20 is used after calibration (calibration process) for correcting distortion of an image involving the focal length of the lens of the camera, lens distortion, and the like is carried out. However, depending on the calibration processing approach, there is a case where an error component included in the length calculation value in regard to the fork length detected from the captured image by the image capturing device 20 becomes so large as to cause a concern about deterioration in reliability.

Figure 9:
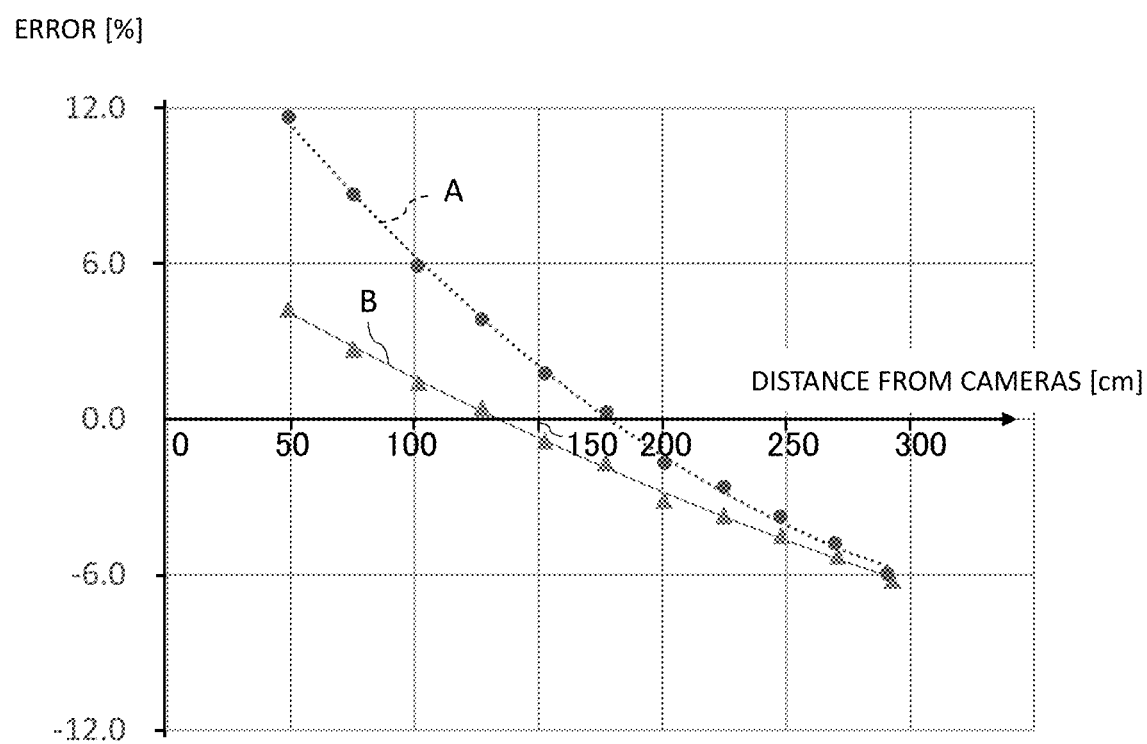
FIG. 9 is a diagram explaining a specific example of an error component included in the length calculation value by a calculating unit.

In FIG. 9, specific examples of the change tendency of an error component included in the length calculation value due to a change in a distance from the image capturing device 20 (an intermediate portion between the cameras arranged side by side) to an object measured as a target are represented by a dotted line A and a solid line B. The example of the change tendency of the error component represented by the dotted line A in FIG. 9 is an example in a case where the calibration of the image capturing device 20 is performed by a direct linear transformation (DLT) approach. The example of the change tendency of the error component represented by the solid line B in FIG. 9 is an example in a case where the calibration of the image capturing device 20 is performed by an approach combining the DLT approach and camera lens distortion correction. The specific examples of the change tendency of the error component by the dotted line A and the solid line B in FIG. 9 are acquired by the experiment as follows. In the experiment, in a state in which a rod-shaped member whose length has been actually measured is arranged in such a way as to be along a side-by-side arrangement direction of two cameras of the image capturing device 20, the image capturing device 20 captures images while the distance to the rod-shaped member from the image capturing device 20 (an intermediate portion between the cameras) is changed. Then, the length calculation value of the rod-shaped member calculated by the calculating unit 34 from the captured images by the image capturing device 20 is compared with the actually measured value of the rod-shaped member, and an error component included in the length calculation value of the rod-shaped member is calculated.

Figure 10:
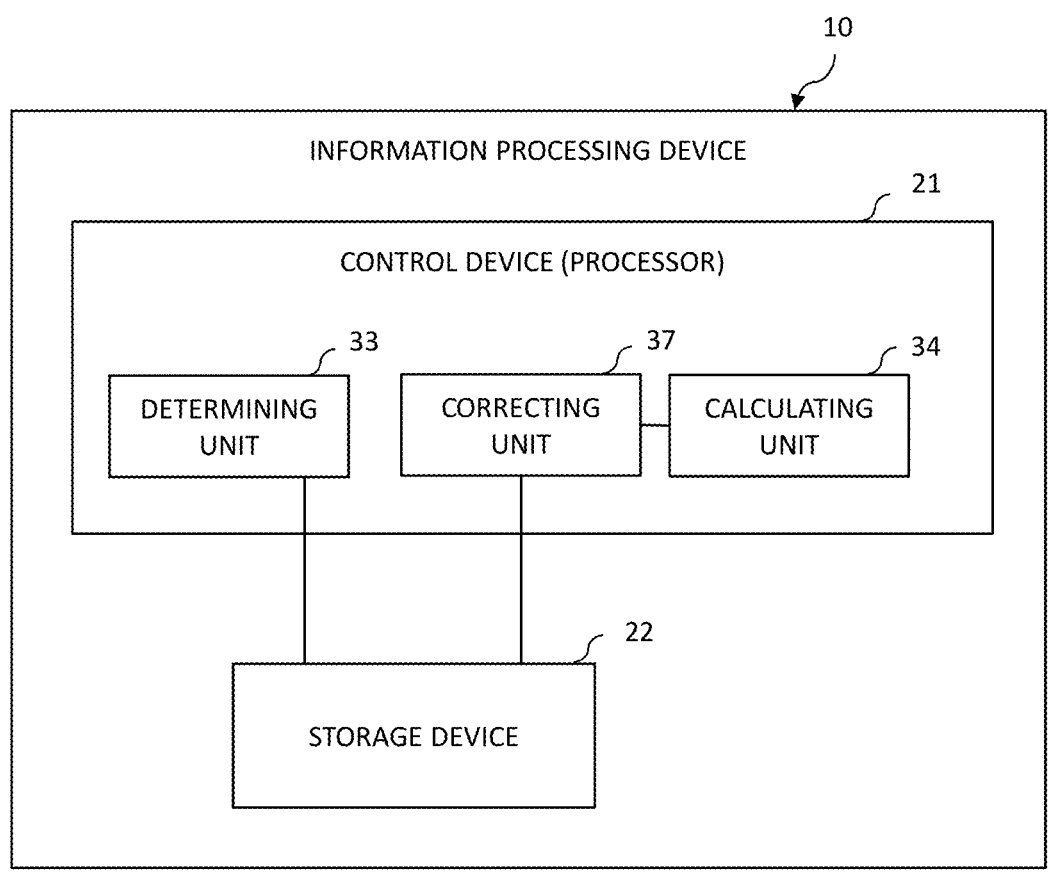
FIG. 10 is a block diagram explaining the configuration of an information processing device according to a second example embodiment of the present invention.

In the second example embodiment, a control device 21 of the information processing device 10 includes a correcting unit 37 as illustrated in FIG. 10. The information processing device 10 of the second example embodiment includes a detecting unit 30, a specifying unit 31, a following unit 32, an analyzing unit 35, and a display control unit 36 as in the first example embodiment, but the illustration of these members is omitted in FIG. 10. In FIG. 10, the illustration of an input device 23, a storage device 24, and a display device 25 is also omitted.

In the second example embodiment, the storage device 22 previously stores, as data for length calculation value correction for the fork length, relationship data between the distance from the image capturing device 20 to the fish to be measured and the error component included in the length calculation value by the calculating unit 34, as represented by the dotted line A and the solid line B in FIG. 9. The data for correction is not limited to the relationship data represented by the dotted line A and the solid line B in FIG. 9, and is generated according to the calibration processing approach and the like.

Figure 12:
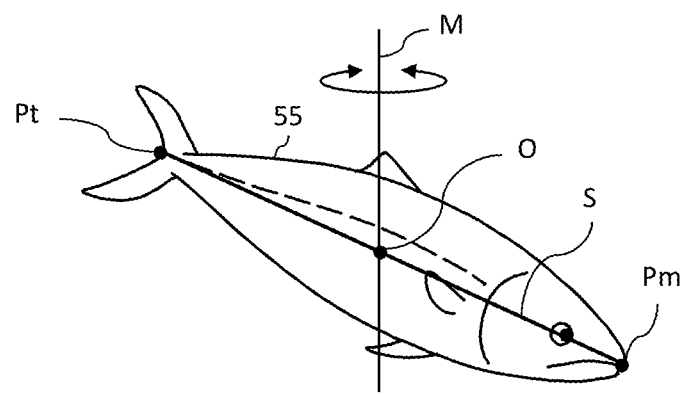
FIG. 12 is a diagram explaining a center position and a rotation angle of an object (fish) to be measured.

In addition to the function in the first example embodiment, the specifying unit 31 further has a function of calculating the coordinates of a center position of the fish to be measured. In the second example embodiment, as illustrated in FIG. 12, an intermediate position of a line segment S connecting the measurement use point Pm at the tip of the mouth and the measurement use point Pt at the tail of the fish to be measured is defined as a center position O of the fish to be measured. Thus, the specifying unit 31 calculates the coordinates of the center position O of the fish to be measured, using the coordinates of the measurement use points Pm and Pt, for example.

In addition to the function in the first example embodiment, the calculating unit 34 further has a function of calculating the distance of an interval between the center position O of the fish to be measured, which has been specified by the specifying unit 31, and the image capturing device 20 (an intermediate portion between the cameras). Distance information on the interval between the center position O of the fish to be measured and the image capturing device 20 thus calculated is associated with the length calculation value for the fork length calculated from the image of the fish to be measured, and stored in the storage device 22.

The correcting unit 37 has a function of correcting the length calculation value for the fork length calculated by the calculating unit 34, using the distance information on the interval between the center position O of the fish to be measured and the image capturing device 20 associated with the length calculation value to be corrected, and the data for length calculation value correction. In other words, the correcting unit 37 corrects the length calculation value for the fork length in a direction to reduce an error component according to the distance of the interval between the center position O of the fish to be measured and the image capturing device 20.

The determining unit 33 determines the measured value of the fork length L of the fish to be measured, similarly to the first example embodiment, using the corrected length calculation value thus corrected.

The configuration of the information processing device 10 and the fish measuring system 50 of the second example embodiment other than the above-described configuration is similar to the configuration of the first example embodiment.

The information processing device 10 and the fish measuring system 50 according to the second example embodiment are configured to correct the length calculation value in a direction to reduce an error component included in the length calculation value of the fork length and caused by the calibration of the image capturing device 20. Consequently, even when the reliability of the length calculation value is concerned due to the error component caused by the calibration of the image capturing device 20, in the second example embodiment, the measured value of the fork length L is determined using a length calculation value in which the error is suppressed smaller. Therefore, the information processing device 10 and the fish measuring system 50 of the second example embodiment can enhance the reliability of the calculation of the fork length L regardless of the calibration approach for the image capturing device 20.

Third Example Embodiment

A third example embodiment according to the present invention will be described hereinafter. In the description of the third example embodiment, constituent elements having the same names as those of the elements constituting the information processing device and the object measuring system (fish measuring system) of the first or second example embodiment are denoted by the same reference signs, and redundant description of these common elements will be omitted.

An information processing device 10 and a fish measuring system 50 according to the third example embodiment, in addition to the configuration of the first or second example embodiment, are further configured to execute a sorting process of excluding a length calculation value assumed to be low in reliability, from among the length calculation values in regard to the fork length calculated by a calculating unit 34.

That is, after the calibration is executed, an image capturing device 20 is incorporated into the fish measuring system 50 for use. A positional relationship between a spatial region (underwater area) for which the calibration is to be performed and the image capturing device 20 is preset. When a fish is present at a position in a region other than the spatial region for which the calibration is to be performed, the length calculation value calculated by the calculating unit 34 from the image of the fish includes an error due to the fact that the calibration has not been executed. For this reason, the length calculation value calculated by the calculating unit 34 from the image of a fish present in a region other than the spatial region for which the calibration is to be performed is low in reliability.

As illustrated in FIG. 12, an intermediate position of the line segment (hereinafter, also referred to as a reference line of the fish body) S connecting the measurement use point Pm at the tip of the mouth and the measurement use point Pt at the tail of the fish is defined as the center position O of the fish body. An imaginary line M passing through this center position O and extending in a direction orthogonal to the side-by-side arrangement direction of two cameras of the image capturing device 20 is defined as a center line of the fish body. It is further assumed that a rotational state in which the fish body is rotated about the center line M of the fish body is represented by an angle range from rotation angles 0° to 90°, where a state when the reference line S of the fish body is parallel to an imaginary plane including the side-by-side arrangement direction of the two cameras of the image capturing device 20 is defined as a rotation angle of 0°. In this case, as the rotation angle of the fish body becomes larger from 0° to 90°, the difference in the distance from the image capturing device 20 increases between the measurement use point Pm and the measurement use point Pt, and for this reason, a difference is produced in how the measurement use points Pm and Pt appear in the captured image (clarity). Because of this, the reliability of the length calculation value for the fork length calculated by the calculating unit 34 from the captured image is lowered.

Figure 11:
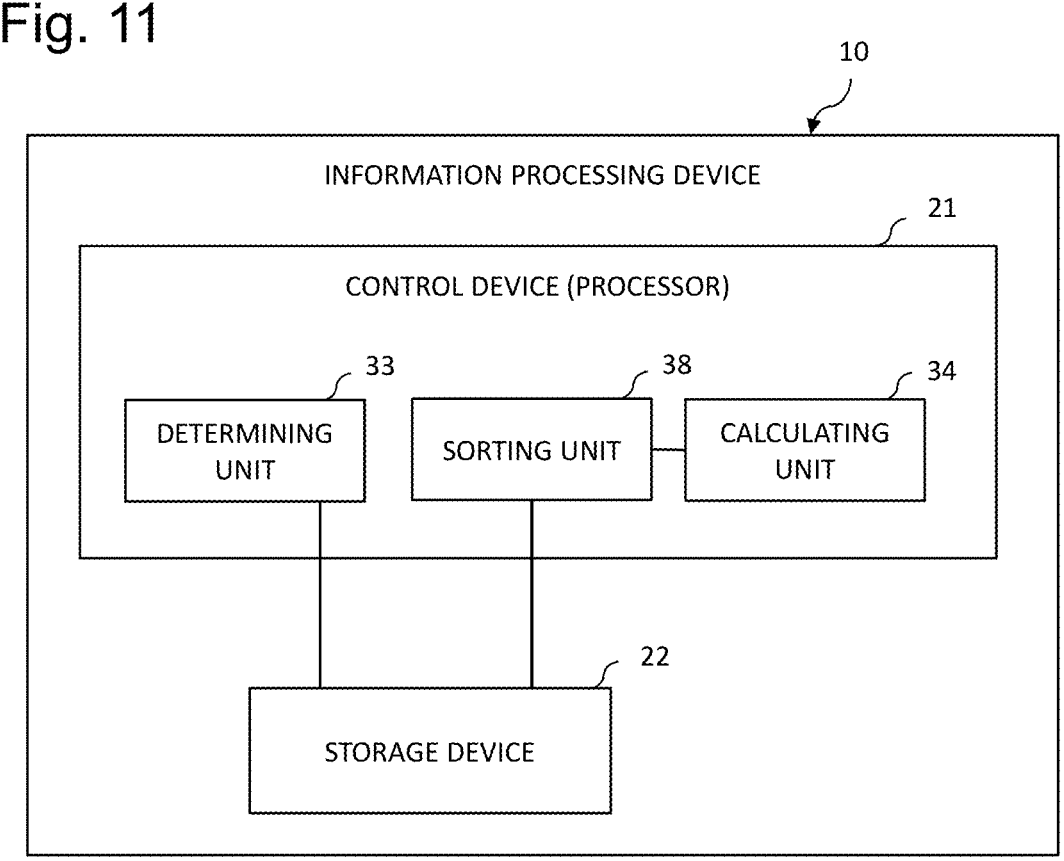
FIG. 11 is a block diagram explaining the configuration of an information processing device according to a third example embodiment of the present invention.

In the third example embodiment, a control device 21 of the information processing device 10 includes a sorting unit 38 illustrated in FIG. 11 in addition to the configuration of the first or second example embodiment. The information processing device 10 of the third example embodiment includes a detecting unit 30, a specifying unit 31, a following unit 32, an analyzing unit 35, and a display control unit 36 as in the first example embodiment, and further includes, if necessary, a correcting unit 37 described in the second example embodiment, but the illustration of these members is omitted in FIG. 11. In FIG. 11, the illustration of an input device 23, a storage device 24, and a display device 25 is also omitted.

The sorting unit 38 has a function of sorting out a length calculation value assumed to be suitable for the processes by the determining unit 33 and the analyzing unit 35, by excluding a length calculation value having low reliability as described above. The sorting unit 38 also has a function of associating the sorted-out length calculation value with information representing that the sorted-out length calculation value is suitable for the processes.

That is, in the third example embodiment, the data of the positional relationship between the spatial region for which the calibration is to be performed and the image capturing device 20 is saved as calibration region information in the storage device 22.

In addition to the function in the first example embodiment, the specifying unit 31 further has a function of calculating the coordinates of the center position O of the fish to be measured, similar to the function mentioned in the second example embodiment. As described above, in the third example embodiment, an intermediate position of the line segment (the reference line of the fish body) S connecting the measurement use point Pm at the tip of the mouth and the measurement use point Pt at the tail of the fish to be measured is defined as the center position O of the fish to be measured. Thus, the specifying unit 31 calculates the coordinates of the center position O of the fish to be measured, using the coordinates of the measurement use points Pm and Pt, for example.

In addition to the function in the first example embodiment, the calculating unit 34 further has a function of calculating the distance of an interval between the center position O of the fish to be measured, which has been specified by the specifying unit 31, and the image capturing device 20 (an intermediate portion between the cameras). Distance information on the interval between the center position O of the fish to be measured and the image capturing device 20 thus calculated is associated with the length calculation value calculated from the image of the fish to be measured, and stored in the storage device 22 as position information on the fish body.

The sorting unit 38 has a function of determining whether the length calculation value calculated by the calculating unit 34 is based on a fish body present in a spatial region for which the calibration is to be performed, using the position information on the fish body associated with this calculated length calculation value and the calibration region information. The sorting unit 38 further has a function of sorting out a length calculation value based on a fish body present in a spatial region for which the calibration is to be performed, by its determination action, and associating the sorted-out length calculation value with information representing that the sorted-out length calculation value is suitable for the processes by the determining unit 33 and the analyzing unit 35.

The sorting unit 38 also has a function of calculating, as attitude information on the fish body, the rotation angle of the fish body detected to be measured, as described above, using the coordinates in a coordinate space of the measurement use point Pm at the tip of the mouth and the measurement use point Pt at the tail of the fish specified by the specifying unit 31. The sorting unit 38 further has a function of comparing the calculated rotation angle of the fish body with a preset threshold value (for example, 35°) to determine whether the rotation angle is less than the threshold value, and sorting out, based on the determination, a fish body having a rotation angle less than the threshold value, from among the fish bodies detected to be measured. The sorting unit 38 further has a function of sorting out a length calculation value calculated from the image of the sorted-out fish body, from among the length calculation values calculated by the calculating unit 34, and associating the sorted-out length calculation value with information representing that the sorted-out length calculation value is suitable for the processes by the determining unit 33 and the analyzing unit 35. When the threshold value used in the sorting process as described above is too small, the number of length calculation values to be sorted out decreases, and the probability of causing an adverse effect resulting from this to the processing results of the determining unit 33 and the analyzing unit 35 rises. Meanwhile, when the threshold value is too large, the probability of sorting out a length calculation value with a large error component due to the rotation of the fish body rises. The threshold value is set in consideration of such situations.

In the third example embodiment, as described above, the sorting unit 38 executes the sorting process using the position information on the fish body and the sorting process using the attitude information on the fish body, and sorts out a length calculation value suitable for the processes by the determining unit 33 and the analyzing unit 35. Thus, in the processes using the length calculation value for the fork length in the determining unit 33 and the analyzing unit 35, a length calculation value determined to be suitable for the processes in both of the sorting processes by the sorting unit 38 each using either the position information or the attitude information on the fish body is used.

The configuration of the information processing device 10 and the fish measuring system 50 of the third example embodiment other than the above-described configuration is similar to the configuration of the first or second example embodiment.

The information processing device 10 and the fish measuring system 50 according to the third example embodiment have a function of excluding a length calculation value assumed to be low in reliability, and sorting out a length calculation value suitable for the processes by the determining unit 33 and the analyzing unit 35, from among the length calculation values calculated by the calculating unit 34. Therefore, the information processing device 10 and the fish measuring system 50 of the third example embodiment can calculate the measured value of the fork length L in which adverse effects due to the arrangement position and the rotational state of the fish body are suppressed, and can enhance the reliability of the calculation of the fork length L.

Fourth Example Embodiment

A fourth example embodiment according to the present invention will be described hereinafter. In the description of the fourth example embodiment, constituent elements having the same names as those of the elements constituting the information processing device and the object measuring system (fish measuring system) of any one of the first to third example embodiments are denoted by the same reference signs, and redundant description of these common elements will be omitted.

Figure 14:
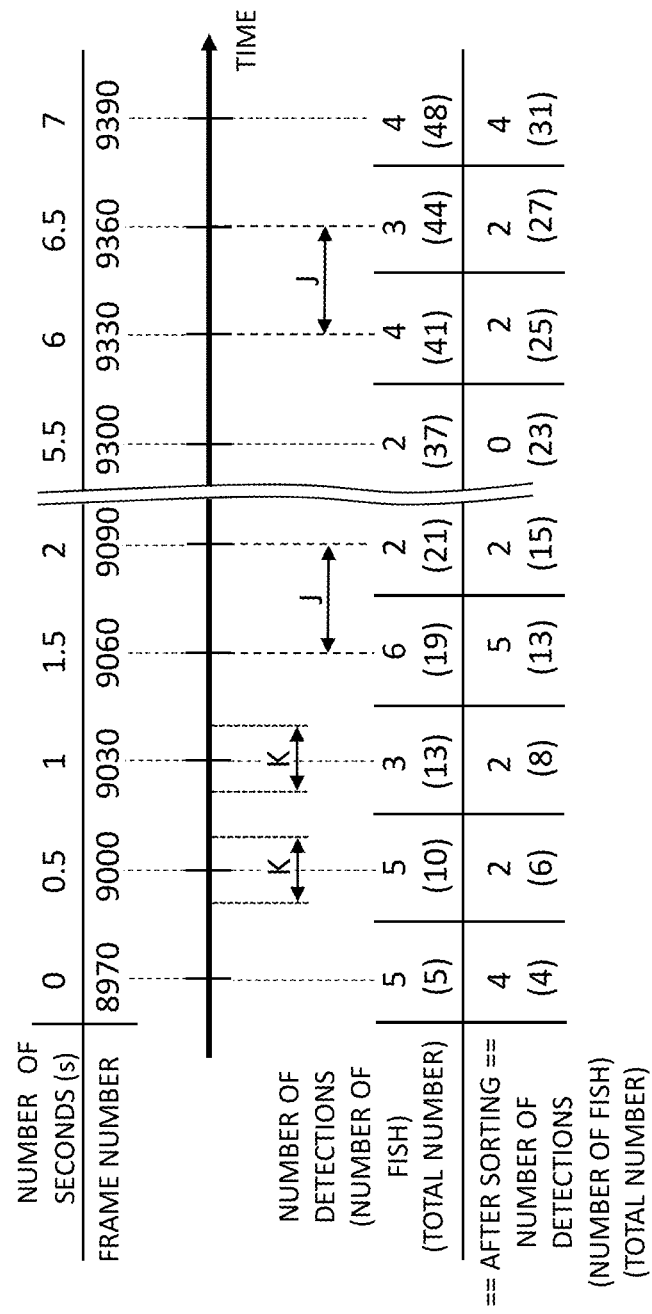
FIG. 14 is a diagram explaining a continuous measurement function of the information processing device according to the fourth example embodiment.

An information processing device 10 and a fish measuring system 50 according to the fourth example embodiment are configured to improve the convenience of the measurer related to the fish measurement, in addition to the configuration of the first, second, or third example embodiment. That is, the information processing device 10 has a function of repeating a series of actions from an action of detecting a fish to be measured in the captured image to an action of determining the measured value of the fork length L of the detected fish, as mentioned in the first to third example embodiments, using the captured image at every set measuring time interval. To give a specific example, the information processing device 10 uses a detecting unit 30 to detect a fish to be measured in each captured image within a set time range K (0.25 seconds (15 frames)) centered on an image capture time point at every set measuring time interval J (0.5 seconds (30 frames)) as illustrated in FIG. 14. Then, after detecting a fish to be measured in each captured image, the information processing device 10 subsequently detects the measurement use points Pt and Pm of the detected fish using the detecting unit 30, a specifying unit 31, and a calculating unit 34, and calculates the length calculation value between the measurement use points Pt and Pm. Furthermore, the information processing device 10 uses a determining unit 33 to perform a calculation process for suppressing an error caused by wriggling of the fish, using a plurality of length calculation values of fish having a high probability of being the same fish calculated from a plurality of captured images in the set time range K, and determine the measured value of the fork length L of the fish to be measured. The information processing device 10 repeats such a series of actions from the detection of the fish to be measured in the captured image to the determination of the measured value of the fork length L, using the captured images in the time range K including the captured image at every set measuring time interval J. Thus, the information processing device 10 can continuously calculate the measured value of the fork length L of the fish to be measured. When the body depth of the fish is also calculated by the series of actions by the detecting unit 30, the specifying unit 31, and the calculating unit 34, the information processing device 10 continuously calculates the measured value of the body depth of the fish as well as the measured value of the fork length L.

Figure 13:
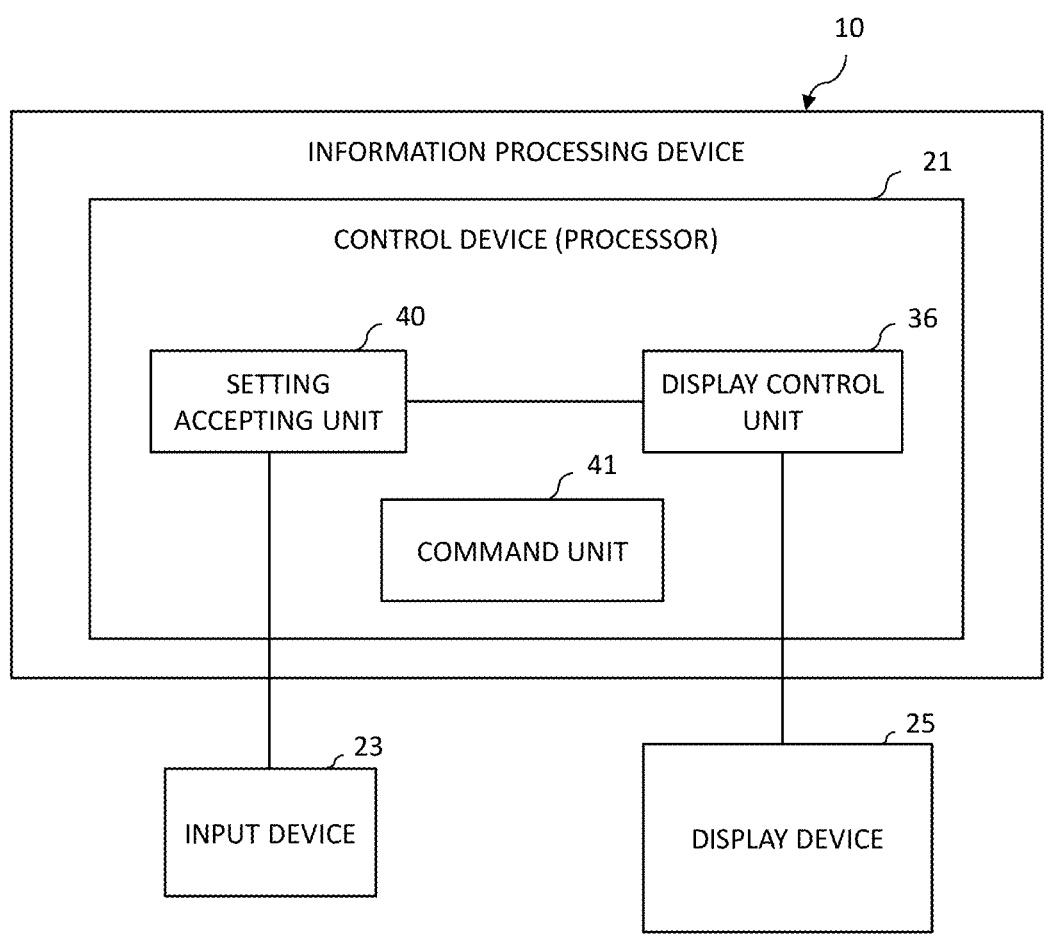
FIG. 13 is a block diagram explaining the configuration of an information processing device according to a fourth example embodiment.

The information processing device 10 according to the fourth example embodiment includes a setting accepting unit 40 and a command unit 41 illustrated in FIG. 13 in a control device 21 in order to achieve a function of continuously calculating the fork length L of the fish to be measured by repeating the series of actions as described above (hereinafter also referred to as continuous measurement function). The information processing device 10 of the fourth example embodiment also includes the detecting unit 30, the specifying unit 31, a following unit 32, the determining unit 33, the calculating unit 34, and an analyzing unit 35 in the control device 21, and a storage device 22 as in the first example embodiment, but the illustration of these members is omitted in FIG. 13. The information processing device 10 of the fourth example embodiment may also include one or both of a correcting unit 37 mentioned in the second example embodiment and a sorting unit 38 mentioned in the third example embodiment, but the illustration of these members is omitted in FIG. 13.

The setting accepting unit 40 in the fourth example embodiment has a function of making a request to the display control unit 36 for the display of a setting screen for the continuous measurement function when a request to set information to be used in the continuous measurement function is received from an input device 23 by an operation on the input device 23 by the measurer. Thus, by the control action of the display control unit 36, the setting screen is displayed on a display device 25, on which the measurer inputs information to be used in the continuous measurement function to the information processing device 10. In the fourth example embodiment, the information as follows is used in the continuous measurement function.

That is, in the continuous measurement function, information on the measurement start timing (for example, the starting frame number) is used for the captured image (video) in which the fish to be measured has been imaged. Information to be used when determining the measurement end timing (for example, the last frame number or a measurement target time from the start to the end of the measurement (or the number of frames)) is also used. Furthermore, in the continuous measurement function, all of captured images that are continuous over the set measurement target time may be used, but here, it is assumed that a captured image selected from among the captured images within the set measurement target time is used. The information on the measuring time interval J (the interval time (the number of seconds) or the number of frames) as described above is used for such captured image selection. Information on the upper limit value of the number of measurements of fish whose fork length L is to be measured, in the measurement target time is further used.

On the setting screen for the continuous measurement function displayed on the display device 25, a column for inputting information used in the continuous measurement function as described above is displayed. The information on the time range K or the number of frames in the time range K is information used in the process of suppressing the measurement error in the fork length L caused by wriggling of the fish (in other words, the process by the determining unit 33), and is given to the control device 21 in advance; accordingly, the information is treated here as information that does not need to be input by the measurer.

The information to be used in the continuous measurement function as described above is appropriately set in consideration of the size of the aquaculture farm, the ecology and swimming speed of the fish cultured in the aquaculture farm, the image capture approach, and the like as follows.

Figure 15:
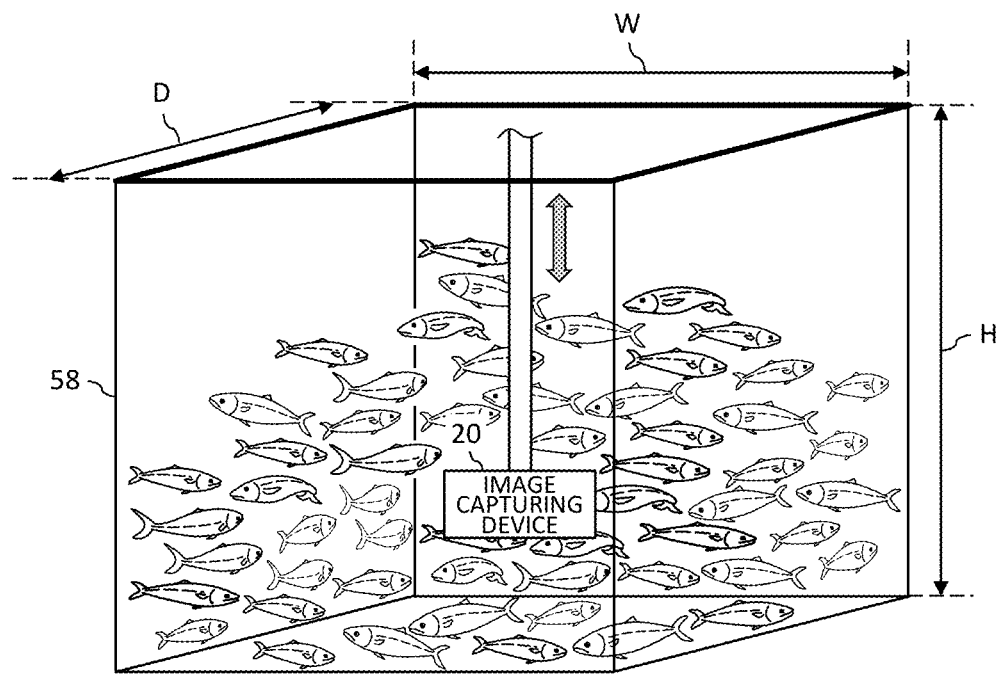
FIG. 15 is a diagram explaining an example of an image capture approach for imaging fish in an aquaculture farm.

For example, fish cultured in an aquaculture farm 58 as illustrated in FIG. 15 is assumed as fish to be measured. Here, it is assumed that the size of the aquaculture farm 58 is width (W)=15 meters, depth (D)=15 meters, and height (H)=15 meters, and that about 7000 fish of almost the same age in years (age in months) are cultured in the aquaculture farm 58. It is also assumed that the fish cultured in the aquaculture farm 58 often go around the aquaculture farm along an aquaculture farm net, and the time required for the fish having the size as described above and cultured in the aquaculture farm 58 to go around the aquaculture farm one time has an average value of 28 seconds by measurement. Furthermore, the image capturing device 20 that images fish is arranged at a side edge portion of the aquaculture farm 58 with the lens orientation toward a central portion of the aquaculture farm 58 and the optical axis of the lens in such an orientation as to be along the water surface.

In such a case, it is assumed that the image capturing device 20 is paused to image the fish in the aquaculture farm 58 for 30 seconds at every water depth of 2.5 meters, while advancing from a water depth of 2.5 meters to the bottom of the aquaculture farm 58 (water depth of 15 meters). In this manner, by defining the image capture time at one water depth as 30 seconds (in other words, a time substantially similar to the time required for the fish to go around the aquaculture farm 58 one time (28 seconds)), imaging multiple times the same fish going around by the image capturing device 20 can be suppressed. Although the fish distribution status in the aquaculture farm 58 changes depending on the season, the elapsed time from feeding, and the like, by imaging the fish while the image capturing device 20 moves in the direction of the water depth as described above, the whole fish in the aquaculture farm can be imaged irrespective of the change in the fish distribution status. An interval between the water depth points at which the inside of the aquaculture farm 58 is imaged by the image capturing device 20 as described above is set in consideration of the visual field range of the image capturing device 20.

The information used in the continuous measurement function is set by, for example, the measurer in consideration of the method of imaging the fish in the aquaculture farm 58 as described above, the swimming speed of the fish, the frame range of the captured image in which the fish appears suitably for the measurement of the fork length L and the like, and other factors. To give a specific example, the frame number: 8970 indicated in FIG. 14 is set as the starting frame number as information on the measurement start timing. The frame number: 9390 indicated in FIG. 14 is set as the last frame number as information to be used when determining the measurement end timing. Furthermore, 0.5 seconds (30 frames) is set as the measuring time interval J. In addition, 30 fish are set as the upper limit value of the number of measurements of fish in the measurement target time. Here, the information on the time range K to be used in the process related to wriggling of the fish is preset to 0.25 seconds (15 frames) as a default value and given to the control device 12. For example, seven seconds, which is the measurement target time from the start to the end of the measurement, may be set as information to be used when determining the measurement end timing. Furthermore, for example, 420, which is the number of frames from the start to the end of the measurement, may be set as information to be used when determining the measurement end timing.

The command unit 41 has a function of controlling the action of the continuous measurement function, using information input to the setting screen by the setting accepting unit 40. That is, when detecting that the start of the continuous measurement function has been requested by an operation on the input device 23 by the measurer while the information to be used in the continuous measurement function is set, the command unit 41 instructs the detecting unit 30 and the like to start the action in order to execute the continuous measurement function as described above. A target captured image on which the detecting unit 30 starts the detection action by the continuous measurement function when an instruction to start the continuous measurement function is made may be a selected one of the captured image according to the set starting frame number and the captured image displayed on the display device 25. In this case, the control device 21 is provided with a function of allowing the measurer to select the captured image for the start of measurement by the continuous measurement function from among the captured image according to the starting frame number and the captured image being displayed, and accepting information on the result of the selection.

The command unit 41 monitors a status where the measured value of the fork length L of fish is being calculated by a series of actions of the detecting unit 30, the specifying unit 31, the following unit 32, the calculating unit 34, and the determining unit 33, and when it is determined by this monitoring that a measurement end condition is satisfied, makes an instruction to end the continuous measurement function. Here, one of the measurement end conditions is that the total number of detections since the start of measurement has reached the set upper limit value of the number of measurements. In order to determine whether this condition is satisfied, each time the measured value of the fork length L is calculated based on the captured images in the time range K including the captured image at every measuring time interval J, the command unit 41 counts the number of fish (number of detections) for which the measured value has been calculated. As another measurement end condition, a condition that the calculation of the measured value of the fork length L using the captured images in the time range K including a captured image with the set last frame number has ended is set. When one of these measurement end conditions is satisfied, the command unit 41 makes an instruction to end the continuous measurement function. The measurement end condition is not limited to the above-described examples, and may be appropriately set. For example, using the measurement target time (or the number of frames) from the start to the end of the measurement as described above, instead of the last frame number, a condition that the image capture time of the captured images used for the measurement has reached the measurement target time (or the number of frames) may be defined as the measurement end condition.

When the fish bodies in the spatial region for which the calibration is to be performed are sorted by the sorting unit 38 in the third example embodiment, the end of the continuous measurement function is determined based on the number of the fish thus sorted out (for example, the total number of detections after sorting, as illustrated in FIG. 14).

The information processing device 10 and the fish measuring system 50 including the information processing device 10 in the fourth example embodiment can obtain effects similar to the effects of the first to third example embodiments as described above by having the configurations of the first to third example embodiments. Moreover, in the fourth example embodiment, since the information processing device 10 and the fish measuring system 50 have a configuration for achieving the continuous measurement function, the convenience can be enhanced by the continuous measurement function.

Fifth Example Embodiment

A fifth example embodiment will be described hereinafter. In the description of this fifth example embodiment, constituent elements having the same names as those of the elements constituting the information processing device 10 and the fish measuring system 50 in one of the first to fourth example embodiments are denoted by the same reference signs, and redundant description of these common elements will be omitted.

Figure 16:
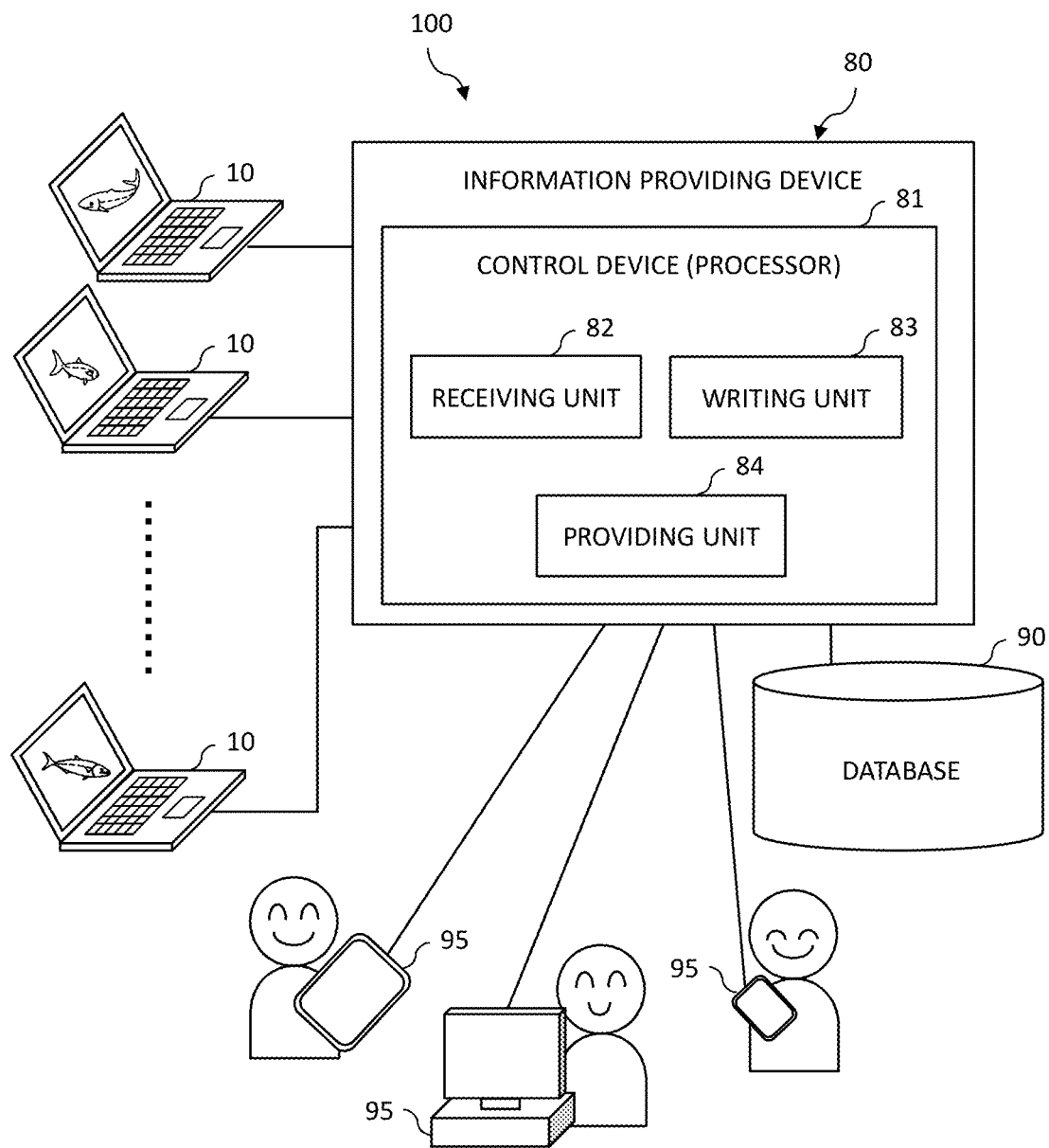
FIG. 16 is a block diagram explaining the configuration of an information providing system according to a fifth example embodiment.

FIG. 16 is a diagram illustrating a simplified configuration of an information providing system in the fifth example embodiment. The information providing system 100 of the fifth example embodiment is a system that provides an information requester with aquaculture status information representing the growing status of cultured fish. The aquaculture status information is information using the measured value of the fork length L of fish calculated by an information processing device 10 (fish measuring system 50) having the configuration mentioned in any one of the first to fourth example embodiments.

That is, the information providing system 100 has a configuration including the information processing device 10 and an information providing device 80. The information processing device 10 is connected to the information providing device 80 via an information communication network. The information processing device 10 has the configuration mentioned in any one of the first to fourth example embodiments. The number of information processing devices 10 connected to the information providing device 80 may be one, but it is assumed here that the information processing devices 10 individually owned by a plurality of different business entities that culture fish are connected to the information providing device 80. That is, the information processing devices 10 each calculate the measured values of the fork length L and the body weight of the fish in the aquaculture farms of different business entities and perform analysis using the calculated measured values to hold information on the results of the calculation and the results of the analysis. The information processing device 10 owned by a business entity having a plurality of aquaculture farms, for example, holds information on fish in this plurality of aquaculture farms.

In addition to the configuration of any one of the first to fourth example embodiments, the information processing device 10 has a function of transmitting the aquaculture farm information to the information providing device 80, as a function of a control device (processor) 21. FIG. 17 illustrates an example of the aquaculture farm information transmitted from the information processing device 10 to the information providing device 80. In this example, the aquaculture farm information transmitted to the information providing device 80 includes not only the measured value of the fork length L of fish calculated by a determining unit 33 of the control device 21 of the information processing device 10, but also the body weight of the fish and the analysis result by an analyzing unit 35 using the measured values of a plurality of fish at the same image capture date and time. Such information related to the fork length L and the body weight of fish is associated with preset information such as the name and identification information (business entity number) and the like of a business entity that cultures the measured fish, and the image capture date and time. Information transmitted from the information processing device 10 to the information providing device 80 as the aquaculture farm information may be predetermined or may be selected by an operator from among a plurality of pieces of information displayed as transmission candidates on a display device 25.

The timing at which the information processing device 10 transmits information to the information providing device 80 is, for example, a timing at which an operator of the information processing device 10 operates an input device 23 and with this operation, an instruction to transmit the aquaculture farm information is input to the information processing device 10.

The information providing device 80 is connected not only to the information processing device 10 but also to a database 90, which is a storage device, via an information communication network or directly. The information providing device 80 can be further connected to a terminal device 95 via an information communication network. The terminal device 95, which is a device operated by an information requester, includes a display unit and has a function of displaying information received via an information communication network by a communication function, on the display unit. The number of terminal devices 95 connected to the information providing device 80 is not limited. In the example in FIG. 16, the database 90 is a device provided separately from the information providing device 80, but instead, a storage device functioning as the database 90 may be built in the information providing device 80.

The information providing device 80 includes a control device 81. The control device 81 is constituted by, for example, a processor such as a CPU. The control device 81 includes a receiving unit 82, a writing unit 83, and a providing unit 84 as functional units, for example, by the processor of the information providing device 80 executing a computer program saved in a storage unit (not illustrated).

The receiving unit 82 has a function of accepting the aquaculture farm information from the information processing device 10. The writing unit 83 has a function of saving the aquaculture farm information received from the information processing device 10 in the database 90. With the functions of these receiving unit 82 and writing unit 83, the aquaculture farm information regarding fish in the aquaculture farms individually owned by a plurality of business entities is collectively saved in the database 90.

The providing unit 84 has a function of reading requested information from among pieces of the aquaculture farm information saved in the database 90 and returning the read information to the terminal device 95 as the aquaculture status information when requested from the terminal device 95 to provide the aquaculture status information.

As described above, the information providing system 100 of the fifth example embodiment has a configuration capable of collectively saving, in the database 90, the aquaculture farm information regarding fish in a plurality of different aquaculture farms, and providing the information saved in the database 90 to the terminal device 95 of the information requester. Therefore, by using the information providing system 100, for example, a person in charge of buying who plans to purchase fish can easily confirm the growing status of fish in the aquaculture farms of a plurality of business entities that culture fish, simply by operating the terminal device 95. Consequently, the person in charge of buying can purchase, for example, a number of fish of a size that meet the needs, with ease. That is, the information providing system 100 can obtain the effect that a business entity responsible for buying fish, who uses the system, is allowed to procure fish in a stable manner, and the sales of fish can be promoted among aquaculture business entities using the system.

Other Example Embodiments

The present invention is not limited to the first to fifth example embodiments, and a variety of example embodiments can be employed. For example, although the analyzing unit 35 is included in the information processing device 10 in the first to fourth example embodiments, the analysis of information such as the fork length L calculated by the calculating unit 34 may be executed by an information processing device different from the information processing device 10, and in this case, the analyzing unit 35 may be omitted.

Furthermore, in the first to fifth example embodiments, the information processing device 10 may perform an image process for decreasing the turbidity of water in the captured image or an image process for correcting the distortion of the fish body due to the fluctuation of water at an appropriate timing, for example, before the start of the detection process by the detecting unit 30. The information processing device 10 may also perform an image process for correcting the captured image in consideration of image capture conditions for the fish, such as the water depth and brightness. The information processing device 10 performs an image process (image correction) on the captured image in consideration of the image capture environment in this manner, whereby the reliability of the detection process by the detecting unit 30 can be enhanced.

Furthermore, in the first to fifth example embodiments, fish is described as an example of the object to be measured, but the information processing device 10 having the configuration described in the first to fifth example embodiments can be applied to the length measurement of other objects. In particular, the information processing device 10 having the configuration described in the first to fifth example embodiments is effective in measuring the length of an object whose length is to be measured shifts.

In the first to fifth example embodiments, the following unit 32 executes the tracking (following) process when a plurality of fish to be measured is detected from the same captured image. In contrast to this, when a fish to be measured is detected from the captured image, the following unit 32 may execute the tracking (following) process regardless of the number of the detected fish to be measured. For example, in a case where the calculation of the length calculation value by the calculating unit 34 is not executed when a plurality of fish to be measured is detected in the same captured image, the following unit 32 may be omitted because the tracking process need not be performed. The image capturing device 20 is not limited to a form in which a stereo camera is constituted by two cameras, and for example, one camera may have the function of the stereo camera.

The information processing device 10 in the first to fifth example embodiments may further have functions as follows. That is, the control device 21 of the information processing device 10 may have a configuration for calculating the measured value of the fork length L of the fish to be measured in a mode selected by the measurer from a plurality of measurement modes. For example, a manual mode, a semi-automatic mode, and a pre-automatic mode are set as measurement modes. When the continuous measurement function described in the fourth example embodiment can be executed, the automatic mode is also set as a measurement mode.

In the manual mode, the detecting unit 30 detects the measurement use points Pt and Pm (Pb and Ps) of the fish to be measured from the captured image in line with input information by the measurer using the input device 23. In different terms, the detecting unit 30 does not perform either of the action of detecting a fish to be measured from the captured image and the action of detecting the measurement use points Pt and Pm (Pb and Ps) of the fish from the captured image, but detects the measurement use points Pt and Pm (Pb and Ps) in line with input information by the measurer using the input device 23. Then, using the detected measurement use points Pt and Pm (Pb and Ps), the length calculation value of the fork length (or the length calculation value of the fork length and the body depth) of the fish to be measured is calculated by the actions of the specifying unit 31 and the calculating unit 34. The process of suppressing the variation in the length calculation values caused by wriggling of the fish body by the determining unit 33 is omitted.

In the semi-automatic mode, the detecting unit 30 detects a fish to be measured from the captured image in line with input information by the measurer using the input device 23, and detects the measurement use points Pt and Pm (Pb and Ps) of the detected fish using the reference data for measurement use point detection. In other words, the fish to be measured is detected in line with the manually input information, but the measurement use points Pt and Pm (Pb and Ps) are detected by the detecting unit 30. The actions other than such an action of the detecting unit 30 are similar to the actions in the manual mode.

In the pre-automatic mode, the detecting unit 30 detects a fish to be measured from the captured image using the reference data for fish body detection, and further detects the measurement use points Pt and Pm (Pb and Ps) of the detected fish using the reference data for measurement use point detection. Then, using the detected measurement use points Pt and Pm (Pb and Ps), the length calculation value of the fork length (or the length calculation value of the fork length and the body depth) of the fish to be measured is calculated by the actions of the specifying unit 31 and the calculating unites 34. Furthermore, the determining unit 33 executes the process of suppressing variations in the length calculation values caused by wriggling of the fish body, and determines the measured value of the fork length L.

In the automatic mode, in addition to the action of the pre-automatic mode described above, the continuous measurement function described in the fourth example embodiment is executed.

In addition to the configuration described above, the control device 21 of the information processing device 10 in the first to fifth example embodiments may have a configuration for allowing the measurer to select a mode to be executed from among a plurality of measurement modes as described above, and accepting information on the selected mode. Then, the control device 21 may be provided with a command unit that controls the actions of the functional units such as the detecting unit 30 in the accepted measurement mode. As described above, when the control device 21 of the information processing device 10 has a configuration for measuring the fork length of the fish to be measured in a mode selected by the measurer from among the plurality of measurement modes, the practicability of the information processing device 10 can be enhanced. When the control device 21 of the information processing device 10 is provided not only with the pre-automatic mode and the automatic mode but also with the manual mode and the semi-automatic mode, the fork length of fish that has not been measured in the pre-automatic mode or the automatic mode can be measured in the manual mode or the semi-automatic mode.

Figure 18:
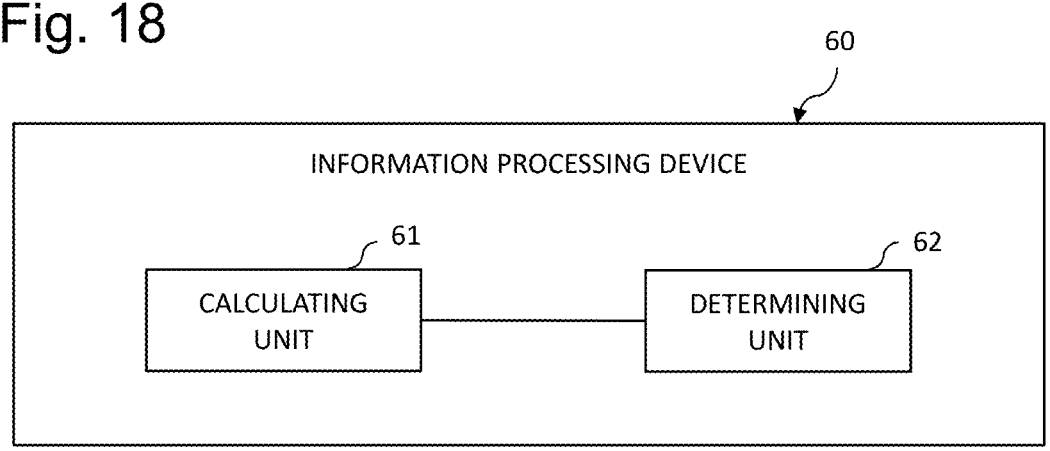
FIG. 18 is a block diagram illustrating a simplified configuration of an information processing device according to another example embodiment of the present invention.
Figure 19:
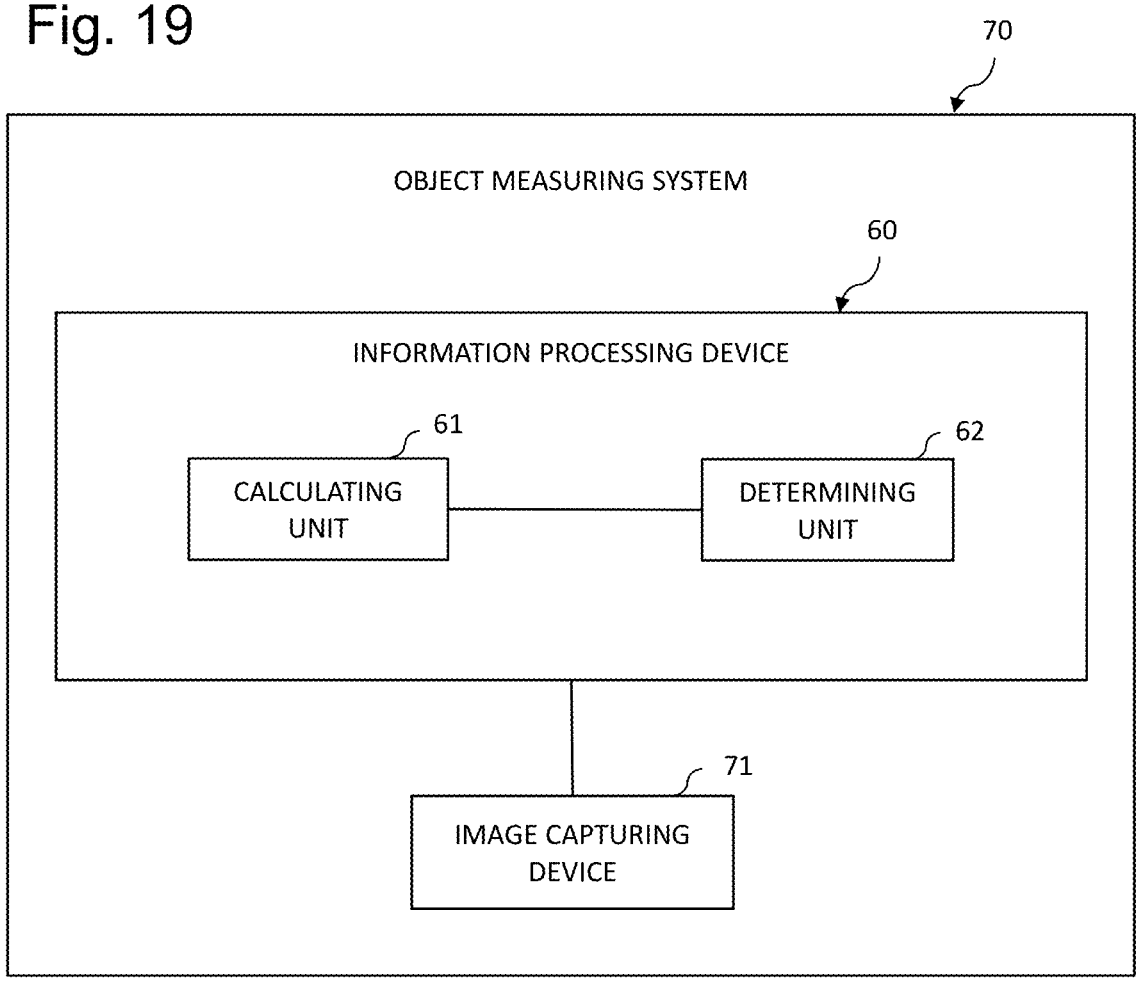
FIG. 19 is a block diagram illustrating a simplified configuration of an object measuring system including the information processing device having the configuration illustrated in FIG. 18.

FIG. 18 illustrates a simplified configuration of an information processing device according to another example embodiment of the present invention. The information processing device 60 illustrated in FIG. 18 constitutes an object measuring system 70 together with an image capturing device 71, as illustrated in FIG. 19.

The information processing device 60 in FIG. 18 includes, as functional units, a calculating unit 61 and a determining unit 62. The calculating unit 61 has a function of calculating, as a length calculation value, a length between parts set for measuring the length of an object, from an image of the object in a captured image in which the object to be measured has been imaged.

The determining unit 62 has a function of selecting, in accordance with a selection rule that is pre-assigned, a length calculation value assumed to be a length calculation value when the object is in a basic attitude for length measurement, from among the length calculation values individually calculated from a plurality of captured images having different image capture time points within a set time range. The determining unit 62 also has a function of determining the measured value of the length of the object using the selected length calculation value.

Since the information processing device 60 and the object measuring system 70 have the functions as described above, an adverse effect by a change in attitude of the object to be measured can be suppressed in measuring the length of the object, and the reliability of the measured value can be enhanced.

Some or all of the above example embodiments can also be described as in the following supplementary notes, but are not limited to the following.

(Supplementary Note 1)

An information processing device includes:
a calculating unit that calculates, as a length calculation value, a length between parts set for measuring a length of an object to be measured, from an image of the object in a captured image in which the object has been imaged; and
a determining unit that selects, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determines a measured value of the length of the object using the selected length calculation value.

(Supplementary Note 2)

The information processing device according to supplementary note 1, further includes a following unit that follows the object to be measured in the plurality of captured images having different image capture time points within the set time range, and
the determining unit selects, in accordance with the selection rule, the length calculation value from among the length calculation values of objects that are each the same as the object followed by the following unit, and determines the measured value of the length of the object for each of the objects that have been followed.

(Supplementary Note 3)

In the information processing device according to supplementary note 1 or 2, the length calculation value calculated by the calculating unit includes an error component caused by an image capturing device that captures the captured image,
the information processing device further includes a correcting unit that corrects the length calculation value based on data for correction with which the length calculation value is corrected in a direction in which the error component is reduced.

(Supplementary Note 4)

The information processing device according to any one of supplementary notes 1 to 3, further includes a sorting unit that sorts out the length calculation value to be used in a process by the determining unit, using at least one of position information on the object and attitude information representing an attitude of the object.

(Supplementary Note 5)

In the information processing device according to any one of supplementary notes 1 to 4, the determining unit selects a plurality of the length calculation values and determines an average value of the selected length calculation values as the measured value of the length of the object.

(Supplementary Note 6)

The information processing device according to any one of supplementary notes 1 to 5, further includes a command unit that controls a continuous measurement action in which a series of actions that determine the measured value of the length of the object in the captured image is repeatedly and continuously performed while replacing the captured image with another one of the captured images.

(Supplementary Note 7)

In the information processing device according to supplementary note 6, the command unit monitors the continuous measurement action and ends the continuous measurement action when determining by the monitoring that a predetermined measurement end condition is satisfied.

(Supplementary Note 8)

An object measuring system includes:

an image capturing device that images an object to be measured; and an information processing device that calculates a measured value of a length between parts set for measuring a length of the object, from an image of the object in a captured image captured by the image capturing device, in which the information processing device includes:

a calculating unit that calculates, as a length calculation value, the length between the parts set for measuring the length of the object, from an image of the object in the captured image; and a determining unit that selects, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determines the measured value of the length of the object using the selected length calculation value.

(Supplementary Note 9)

An object measuring method includes:

calculating, as a length calculation value, a length between parts set for measuring a length of an object to be measured, from an image of the object in a captured image in which the object has been imaged; and selecting, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determining a measured value of the length of the object using the selected length calculation value.

(Supplementary Note 10)

A program storing medium stores a computer program that causes a computer to execute a process including:

calculating, as a length calculation value, a length between parts set for measuring a length of an object to be measured, from an image of the object in a captured image in which the object has been imaged; and selecting, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determining a measured value of the length of the object using the selected length calculation value.

(Supplementary Note 11)

An information providing system includes:

an information processing device including: a calculating unit that calculates, as a length calculation value, a length between parts set for measuring a length of an object to be measured, from an image of the object in a captured image in which the object has been imaged; and a determining unit that selects, in accordance with a selection rule that is pre-assigned, the length calculation value assumed to be a length calculation value when the object is in a basic attitude for length measurement, from among the length calculation values individually calculated from a plurality of captured images having different image capture time points within a set time range, and determines a measured value of the length of the object using the selected length calculation value; and an information providing device including: a writing unit that receives, from the information processing device, information including at least one of the measured value of the length of the object and information calculated using the measured value, and writes the received information into a storage device; and a providing unit that, when requested to provide information, reads requested information from the storage device and returns the read information to an information providing request source.

The present invention has been described above with reference to the above-described example embodiments as typical examples. However, the present invention is not limited to the example embodiments described above. That is, the present invention can apply a variety of aspects that can be understood by those skilled in the art, within the scope of the present invention.

This application claims the benefit of priority of the prior JP 2018-057974 A, filed on Mar. 26, 2018, and JP 2018-127322 A, filed on Jul. 4, 2018, the entire contents of which are incorporated herein by reference.

REFERENCE SIGNS LIST 10, 60 information processing device
32 following unit
33, 62 determining unit
34, 61 calculating unit
37 correcting unit
38 sorting unit
50 fish measuring system
70 object measuring system

What is claimed is:

1. An information processing device comprising:
at least one processor configured to:
for each of a plurality of images of an object to be measured, calculate, as a first length calculation value, a length between parts set for measuring a length of the object, from a corresponding image of the plurality of images, to yield a plurality of first length calculation values respectively corresponding to the plurality of images, wherein the plurality of images are captured by an image capturing device at different capture time points within a set time range; select a plurality of second length calculation values from the plurality of first length calculation values, based on attitude information of the object, such that the plurality of second length calculation values do not include all of the plurality of first length calculation values, wherein the attitude information is information about a rotation angle of the object, the rotation angle of the object being set such that the rotation angle of the object increases as a difference between a first distance and a second distance increases, the first distance being a distance between a first part of the parts and the image capturing device, the second distance being a distance between a second part of the parts and the image capturing device;

select, in accordance with a selection rule that is pre-assigned, one or more of the plurality of second length calculation values under an assumption that the object is in a basic attitude for length measurement; and determine a measured value of the length of the object using the selected one or more of the plurality of second length calculation values.

2. The information processing device according to claim 1, wherein the object is one of a plurality of objects within the plurality of objects, and the measured value of the length of each object is determined.

3. The information processing device according to claim 1, wherein the calculated first length calculation value for each image includes an error component caused by the image capturing device; and the at least one processor is further configured to correct the first length calculation value for each image based on data for correction with which the first length calculation value is corrected in a direction in which the error component is reduced.

4. The information processing device according to claim 1, wherein the at least one processor is further configured to sort the plurality of second length calculation values when selecting the one or more of the plurality of second length calculation values that are used to determine the measured value of the length of the object, using at least one of position information on the object and the attitude information of the object.

5. The information processing device according to claim 1, wherein the at least one processor determines the measured value of the length of the object by averaging the selected one or more of the plurality of second length calculation values.

6. The information processing device according to claim 1, wherein the at least one processor is further configured to continuously determine the measured value of the length of the object as the plurality of images are captured.

7. The information processing device according to claim 6, wherein the at least one processor stops continuously determining the measured value of the length of the object when a predetermined measurement end condition is satisfied.

8. An object measuring system comprising:
the image capturing device for capturing the plurality of images of the object to be measured at the different capture time points within the set time range; and
the information processing device according to claim 1 to determine the measured value of the length of the object.

9. An object measuring method comprising:
by at least one processor,
or each of a plurality of images of an object to be measured, calculating, as a first length calculation value, a length between parts set for measuring a length of the object, from a corresponding image of the plurality of images, to yield a plurality of first length calculation values respectively corresponding to the plurality of images, wherein the plurality of images are captured by an image capturing device at different capture time points within a set time range; selecting a plurality of second length calculation values from the plurality of first length calculation values, based on attitude information of the object, such that the plurality of second length calculation values do not include all of the plurality of first length calculation values, wherein the attitude information is information about a rotation angle of the object, the rotation angle of the object being set such that the rotation angle of the object increases as a difference between a first distance and a second distance increases, the first distance being a distance between a first part of the parts and the image capturing device, the second distance being a distance between a second part of the parts and the image capturing device;

selecting, in accordance with a selection rule that is pre-assigned, one or more of the plurality of second length calculation values under an assumption that the object is in a basic attitude for length measurement; and determining a measured value of the length of the object using the selected one or more of the plurality of second length calculation values.

10. A non-transitory program storing medium storing a computer program that is executable by a computer to perform a process comprising:
for each of a plurality of images of an object to be measured, calculating, as a first length calculation value, a length between parts set for measuring a length of the object, from a corresponding image of the plurality of images, to yield a plurality of first length calculation values respectively corresponding to the plurality of images, wherein the plurality of images are captured by an image capturing device at different capture time points within a set time range; selecting a plurality of second length calculation values from the plurality of first length calculation values, based on attitude information of the object, such that the plurality of second length calculation values do not include all of the plurality of first length calculation values, wherein the attitude information is information about a rotation angle of the object, the rotation angle of the object being set such that the rotation angle of the object increases as a difference between a first distance and a second distance increases, the first distance being a distance between a first part of the parts and the image capturing device, the second distance being a distance between a second part of the parts and the image capturing device;

selecting, in accordance with a selection rule that is pre-assigned, one or more of the plurality of second length calculation values under an assumption that the object is in a basic attitude for length measurement; and determining a measured value of the length of the object using the selected one or more of the plurality of second length calculation values.

11. An information providing system comprising:
the information processing device according to claim 1; and
a second information providing device including at least one second processor configured to:
receive, from the information processing device, information including at least one of the measured value of the length of the object and additional information calculated using the measured value;
write the information that has been received into a storage device; and
when requested to provide the information, read the information from the storage device and return the read information to an information providing request source.

* * * * *